(12) United States Patent
Johnson

(10) Patent No.: US 7,287,731 B2
(45) Date of Patent: Oct. 30, 2007

(54) HEAVY-DUTY STABILIZED CAMERA HEAD WITH CAMERA POSITION SENSING

(75) Inventor: Joel W. Johnson, Newport Beach, CA (US)

(73) Assignee: Camera Dynamics Inc., New York, NY (US)

( * ) Notice: Subject to any disclaimer, the term of this patent is extended or adjusted under 35 U.S.C. 154(b) by 0 days.

(21) Appl. No.: 10/475,636

(22) PCT Filed: Apr. 20, 2002

(86) PCT No.: PCT/US02/12731

§ 371 (c)(1), (2), (4) Date: Oct. 20, 2003

(87) PCT Pub. No.: WO02/006376

PCT Pub. Date: Oct. 31, 2002

(65) Prior Publication Data

US 2004/0113033 A1    Jun. 17, 2004

Related U.S. Application Data

(60) Provisional application No. 60/285,349, filed on Apr. 20, 2001.

(51) Int. Cl.
*F16M 11/14* (2006.01)
(52) U.S. Cl. .............. 248/183.3; 352/197; 248/177.1
(58) Field of Classification Search ............ 248/183.3, 248/183.1, 183.4, 187.1, 177.1, 178.1, 123.11, 248/124.1; 352/197
See application file for complete search history.

(56) References Cited

U.S. PATENT DOCUMENTS 1,439,430 A    12/1922    Lyhne (Continued)

FOREIGN PATENT DOCUMENTS

DE    17 73 323 A    4/1971

(Continued)

OTHER PUBLICATIONS

Weaver Steadman ds Remote Head, http://www.essanay.com/RemoteHeads.pdf.

(Continued)

*Primary Examiner*—Amy J Sterling
(74) *Attorney, Agent, or Firm*—Leydig, Voit & Mayer, Ltd.

(57) ABSTRACT

A panhead (1) having a counterbalance action suitable for heavy cameras or equipment, and provides instantaneous electronic measurements of head settings and position. The improved counterbalance utilizes a dual-tower dual-axis non-linear mechanism as well as position encoders indexed to each axis (7-13) of head movement. Potentiometer setting detectors are also indexed to settable adjustments to read and relay such adjustments, and an electronic display (25) conveys information regarding the current positions and settings of the camera head (1). A novel mounting system situated at the top of the head provides for fast and simple mounting and unmounting of equipment or a dutch roll head. In particular, a novel dovetail (19, 21) engagement mechanism swings a dovetail side down during detachment. In an embodiment of the invention, the dutch roll head can be remotely proportionally actuated by a user via a switch mountable to a handle used for panning and tilting of the pan head.

22 Claims, 21 Drawing Sheets

U.S. PATENT DOCUMENTS

| | | | |
|---|---|---|---|
| 3,429,543 A | | 2/1969 | Mooney |
| 4,083,524 A | * | 4/1978 | O'Connor ................ 248/183.3 |
| 4,466,595 A | | 8/1984 | O'Connor |
| 4,955,568 A | | 9/1990 | O'Connor |
| 5,170,197 A | * | 12/1992 | Schmidt et al. ............. 396/428 |
| 5,553,821 A | * | 9/1996 | Ishikawa ............... 248/292.11 |
| 6,027,085 A | | 2/2000 | Ruther |
| 6,484,978 B2 | * | 11/2002 | Voigt et al. ............... 248/182.1 |
| 6,626,412 B1 | * | 9/2003 | Lindsay ...................... 248/550 |
| 6,820,980 B1 | * | 11/2004 | Romanoff et al. .......... 352/243 |

FOREIGN PATENT DOCUMENTS

| | | |
|---|---|---|
| EP | 0 966 154 A | 12/1999 |
| GB | 2 259 787 A | 3/1993 |
| WO | WO 00 39498 A | 7/2000 |

OTHER PUBLICATIONS

Weaver / Steadman2+3 Axis Head, http://www.cinelicht.de/germany/produkte/camera/zubehoer/weaver.html.

Christine Huenergardt, Weaver Steadman's "dsRemote™" Camera System (with Preston System), http://www.chapman-leonard.com/products/remotesys/weaver.htm, Chapman / Leonard Studio Equipment, Inc. (2002).

* cited by examiner

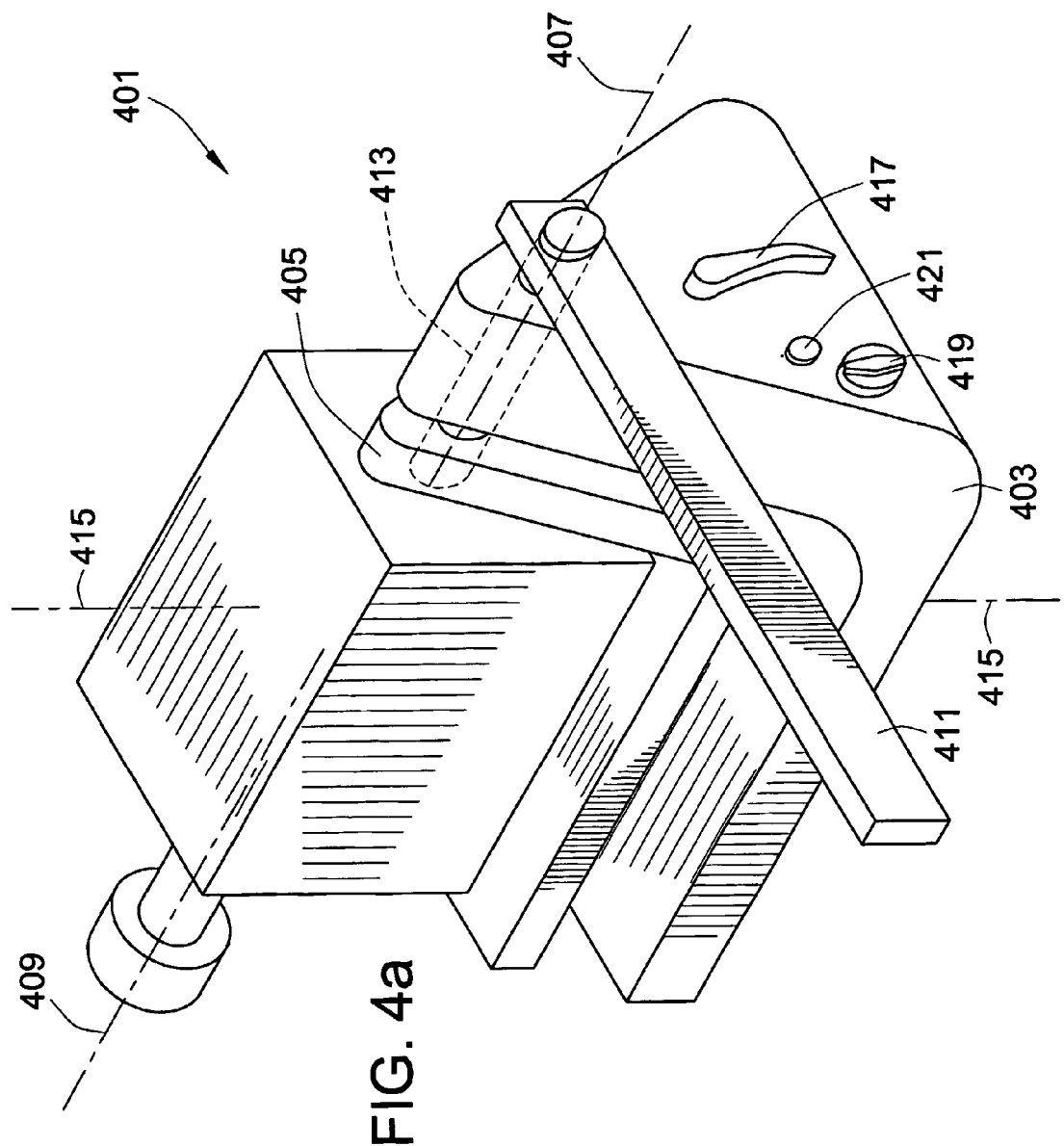

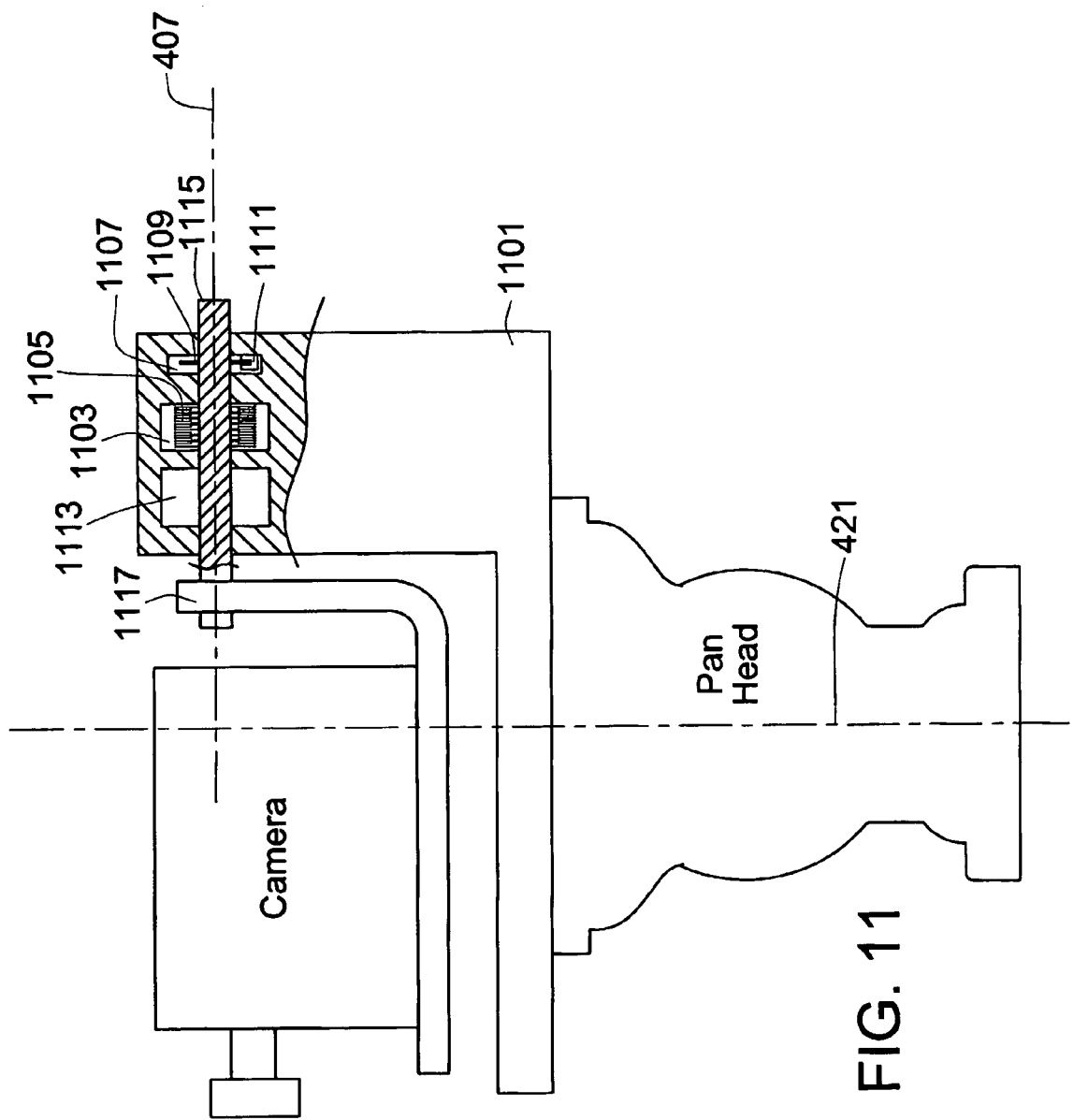

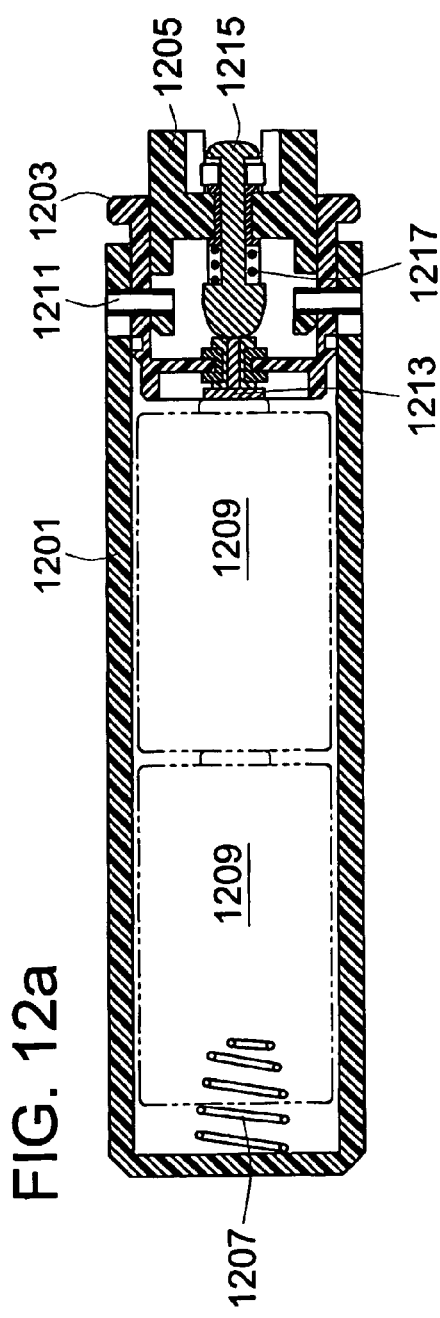
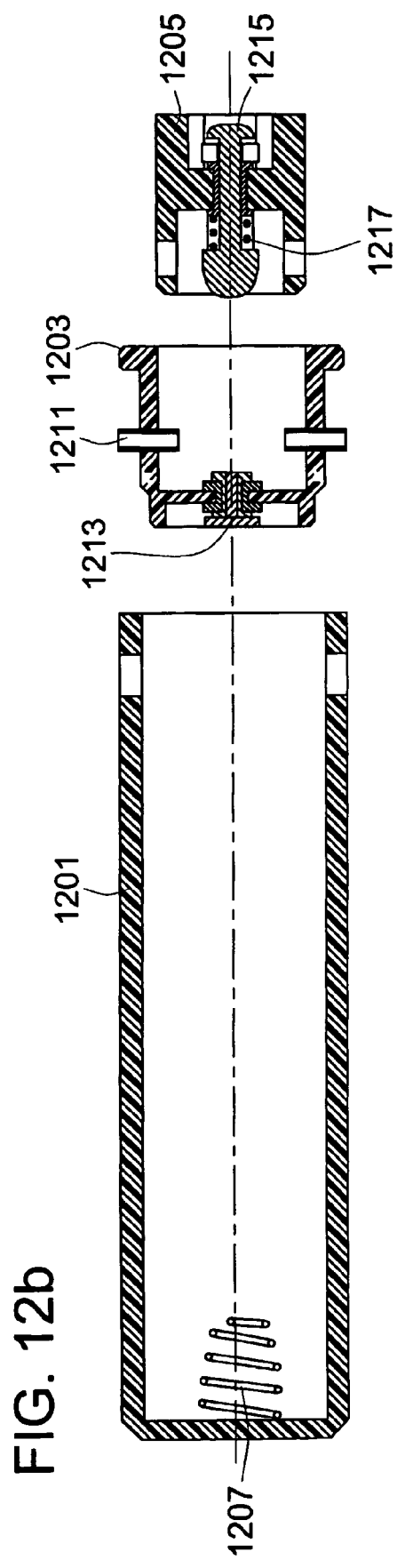
FIG. 12a
FIG. 12b

HEAVY-DUTY STABILIZED CAMERA HEAD WITH CAMERA POSITION SENSING

TECHNICAL FIELD

This invention relates generally to equipment for supporting optical equipment and, more particularly, relates to a camera head for pivotally supporting a camera in a counterbalanced manner.

BACKGROUND OF THE INVENTION

Cameras have been and continue to be critical components in both motion picture and television feature production. An important criterion for the use of a camera in television or motion picture capture tasks is the ability to smoothly follow an action item, such as an athlete, with the camera. However, cameras usable in motion picture and television work are typically heavy and cumbersome to manipulate. For example, a standard television camera may weigh 100 pounds or more. Thus, in order for a camera to be manipulable so as to provide such smooth operation, it is desirable to balance the weight and inertia of the camera and to mitigate the effects of minor unintended forces on the camera by the operator.

In order to stabilize the motion of a camera on a camera head, it is typical to employ drag mechanisms. One such prior art drag mechanism is illustrated in U.S. Pat. No. 4,955,568 ("the '568 patent") to O'Connor et al, entitled "Panhead For Camera," which is assigned to the assignee of the present invention and is hereby incorporated by reference in its entirety for all that it teaches. In particular, the '568 patent illustrates an adjustable fluid drag mechanism. It is useful for camera operators to have ready access to data describing the various drag settings for the camera, so as to accurately adjust such settings and to be able to accurately reproduce a desired setting at a later time. However, the mechanism illustrated in the '568 patent does not provide for the rapid collection and display of measurement data relating to the drag forces set by the operator. Other prior art mechanisms have also not provided integral mechanisms for sensing drag settings and quickly conveying such settings to the camera operator in a unified way. Rather, prior art techniques have generally employed visual mechanical mechanisms that do not provide the level of accuracy, repeatability, and ease of use desirable in the motion picture industry.

Generally, counterbalance measures have been utilized to balance the weight of the camera about the tilt axis. An example of a spring-operated counterbalance technique is described in the '568 patent, previously incorporated by reference in its entirety. Other counterbalance techniques have been employed as well. For example, counterbalances using linear springs or cam and roller architectures have sometimes been employed.

However, prior art counterbalance techniques generally function well only for small to medium tilt angles. While the counterbalance mechanism disclosed in the '568 patent functions over a tilt angle of ±90° and desirably exerts a sinusoidal restoring torque, none of the prior art techniques, including that of the mechanism disclosed in the '568 patent, are adapted and ideally suited for heavier cameras. Many of the cameras in use today for motion picture and television filming work, however, may far exceed 200 pounds in weight. For that reason, a heavy-duty counterbalance mechanism adapted to accommodate the counterbalance loads produced by such equipment is needed.

Additionally, prior art mechanisms for attaching a camera or other equipment unit to a camera head are not suitable for use with heavy equipment. That is, they do not provide sufficient ease of attachment and detachment for cameras that are cumbersome due to extreme weight. For example, a typical sliding dovetail connection requires a user to slide a heavy object along a precise axis while holding the object level until support is achieved. Even systems that permit one side of the dovetail base to drop away for camera removal still require manual intervention by the user to force the dropping side down.

In addition, it is often desirable for a camera operator or film editor to know the position of the camera throughout a shot or sequence in order to reproduce a scene or to coordinate special effects with the actual footage taken. The prior art, however, has not included means by which the camera operator could readily ascertain and thereby reproduce the exact position of the tripod and camera.

Accordingly, it is a general object of the invention to provide an improved camera panhead that smoothly pans and tilts while allowing instantaneous capture and display of camera position and drag setting information. A more specific object is to provide a head that provides the instantaneous electronic capture and display of the camera position and movement.

It is a further object of the invention to provide an improved camera panhead that is able to provide nonlinear counterbalance action for heavy cameras or other equipment throughout a wide range of tilt angles.

It is a further object of the invention to provide a camera head that allows easy and accurate adjustment of the counterbalance and drag settings.

It is a further object of the invention to provide an improved camera head that allows for the natural and uncomplicated mounting and removal of heavy cameras or other equipment to the panhead.

SUMMARY OF THE INVENTION

The invention embodies in general terms an improved camera panhead that provides counterbalance action suitable for heavy cameras or equipment, and that provides instantaneous electronic measurements of head settings and position. The improved counterbalance utilizes a novel dual-tower dual-axis non-linear mechanism to provide sufficient restoring force and integrity to support heavy camera equipment, while still being relatively lightweight. The improved camera head also provides high-accuracy absolute position rotary encoders indexed to each axis of head movement, as well as potentiometer setting detectors indexed to settable adjustments. In this manner, both camera positions and parameter adjustments may be electronically captured, recorded, and displayed to the user.

A conveniently placed electronic display conveys information regarding the current state of the camera head. In particular, a digital LCD graphical user interface is located on the head and displays information relating to the position of the head and the position of the head adjustment settings such as drag and counterbalance settings. The digital display is part of an electronics module that also contains various electrical inputs and outputs. A remote display module may be connected to the electronics module via a cable to remotely display to a user data relating to the head.

A mounting platform situated at the top of the head provides for fast and simple mounting and unmounting of heavy equipment. In particular, a novel dovetail engagement mechanism provides for compressive force by a movable dovetail side during attachment of the camera. However, the novel dovetail engagement mechanism also swings the dovetail side down and away from the dovetail platform during detachment to facilitate easy removal of the camera or other heavy equipment from a dovetail base.

A dutch roll head attachment is mountable upon the mounting platform and is adapted to receive the camera, thus providing an additional axis of camera movement as well as positional information.

An embodiment of the invention comprises a panhead for supporting equipment and providing movement from a vertical position to a tilt position, said panhead comprising, in combination, a tilt housing, a tilt drum defining a tilt axis, said tilt drum being mounted within said housing for rotation about said tilt axis, at least four springs, said springs forming at least two separate pairs of springs, mounted in substantially perpendicular planes to said tilt axis, a common axis disposed substantially parallel to the tilt axis, at least one mount for mounting one end of each of said springs pivotally along a common horizontal axis, said common axis lying below said tilt axis in a vertical plane containing said tilt axis, whereby the end of one spring in each pair of springs coupled to the common axis is mounted between the ends of the other pair of springs coupled to the common axis, the spring pair mountings to the common axis being staggered, and a plurality of mounts for coupling the opposite ends of each pair of said springs to the tilt drum for rotation therewith, said pairs of springs being mounted at an angle to a substantially vertical plane containing the tilt axis when said panhead is in said vertical position, whereby said springs exert a restoring torque when the tilt drum is tilted from said vertical position to said tilt position. An embodiment of the invention further comprises a vertical pan shaft defining a vertical pan axis, and a base housing for mounting said tilt housing on said vertical pan shaft for rotation about said vertical pan axis. An embodiment of the invention further comprises a first integral rotary sensor disposed within the tilt housing and adapted to sense rotation of the tilt drum about the tilt axis and output a first signal indicative of the rotation of the tilt drum about the tilt axis. An embodiment of the invention further comprising a second integral rotary sensor disposed within the base housing and adapted to sense rotation of the tilt housing about the pan axis and output a second signal indicative of the rotation of the tilt housing about the pan axis. An embodiment of the invention further comprises a display unit for displaying a first display related to the rotation of the tilt drum about the tilt axis and a second display related to the rotation of the tilt housing about the pan axis, wherein the first and second displays are derived from the first and second signals respectively. An embodiment of the invention further comprises a roll head mounted to the panhead for rotation of the supported equipment for rotation of the supported equipment about a roll axis, the display unit further comprising an input for receiving a third signal indicative of an amount of roll about the roll axis experienced by the roll head mounted to the panhead, and a third display related to the amount of roll about the roll axis experienced by the roll head, wherein the third display is derived from the third signal.

In an alternate embodiment of the invention comprises a panhead for supporting equipment and providing movement from a vertical position to a tilt position, said panhead comprising, in combination, a tilt housing, a tilt drum defining a tilt axis, said tilt drum being mounted within said housing for rotation about said tilt axis, at least four springs, said springs forming at least two separate pairs of springs, mounted in substantially perpendicular planes to said tilt axis, a common axis disposed substantially parallel to the tilt axis, at least one mount for mounting one end of each of said springs pivotally along a common horizontal axis, said common axis lying below said tilt axis in a vertical plane containing said tilt axis, whereby the end of one spring in each pair of springs coupled to the common axis is mounted between the ends of the other pair of springs coupled to the common axis, the spring pair mountings to the common axis being staggered, and a plurality of mounts for coupling the opposite ends of each pair of said springs to the tilt drum for rotation therewith, said pairs of springs being mounted at an angle to a substantially vertical plane containing the tilt axis when said panhead is in said vertical position, whereby said springs exert a restoring torque when the tilt drum is tilted from said vertical position to said tilt position, a vertical pan shaft defining a vertical pan axis, and a base housing for mounting said tilt housing on said vertical pan shaft for rotation about said vertical pan axis, the panhead further comprising a first integral rotary sensor disposed within the tilt housing and adapted to sense rotation of the tilt drum about the tilt axis and output a first signal indicative of the rotation of the tilt drum about the tilt axis, the panhead further comprising a second integral rotary sensor disposed within the base housing and adapted to sense rotation of the tilt housing about the pan axis and output a second signal indicative of the rotation of the tilt housing about the pan axis, the panhead further comprising a display unit for displaying a first display related to the rotation of the tilt drum about the tilt axis and a second display related to the rotation of the tilt housing about the pan axis, wherein the first and second displays are derived from the first and second signals respectively, the display unit further comprises a plurality of further displays for displaying at least an indication related to the restoring torque exerted about the tilt axis when the tilt drum is tilted from an equilibrium position.

In an alternate embodiment of the invention, a panhead for supporting equipment and providing movement from a vertical position to a tilt position comprises, in combination, a tilt housing, a tilt drum defining a tilt axis, said tilt drum being mounted within said housing for rotation about said tilt axis, at least four springs, said springs forming at least two separate pairs of springs, mounted in substantially perpendicular planes to said tilt axis, a common axis disposed substantially parallel to the tilt axis, at least one mount for mounting one end of each of said springs pivotally along a common horizontal axis, said common axis lying below said tilt axis in a vertical plane containing said tilt axis, whereby the end of one spring in each pair of springs coupled to the common axis is mounted between the ends of the other pair of springs coupled to the common axis, the spring pair mountings to the common axis being staggered, and a plurality of mounts for coupling the opposite ends of each pair of said springs to the tilt drum for rotation therewith, said pairs of springs being mounted at an angle to a substantially vertical plane containing the tilt axis when said panhead is in said vertical position, whereby said springs exert a restoring torque when the tilt drum is tilted from said vertical position to said tilt position, the panhead further comprising a vertical pan shaft defining a vertical pan axis, and a base housing for mounting said tilt housing on said vertical pan shaft for rotation about said vertical pan axis, the panhead further comprising a pan drag assembly for exerting a drag force against rotation of the housing on said vertical pan shaft about said vertical pan axis, the panhead further comprising a tilt drag assembly for exerting a drag force against rotation of the tilt drum, and a display unit for displaying an indication related to an amount of drag force exerted against rotation of the tilt drum about the tilt axis or the tilt housing about the pan axis. In another embodiment of the invention, the panhead further comprises a roll head mounted to the panhead for rotation of the supported equipment about a roll axis, the display unit further comprising a roll display for displaying an indication related to an amount of drag force exerted against rotation of the roll head about the roll axis.

Another embodiment of the invention further comprises a dovetail mount for retaining a removable dovetail rail, the dovetail mount being adapted to secure the removal dovetail rail to a panhead of an equipment supporting device, the dovetail mount comprising: a pair of opposed dovetail sides forming a dovetail track, at least one of said dovetail sides being movable; a movable locking lever; and an actuable coupling mechanism extending between the movable dovetail side and the lever; said locking lever being movable in a first direction for pressing the movable dovetail side toward the opposed dovetail side, thereby retaining the removable dovetail rail, said locking lever being movable in a second direction to move the movable dovetail side away from the opposed dovetail side in a horizontal plane, movement of the locking lever past a threshold point in the second direction further acting to lower the movable dovetail side through the horizontal plane, allowing the removable dovetail rail to be disengaged from the dovetail track. In another embodiment, the actuable coupling mechanism comprises a camming arrangement to lower the movable dovetail side through the horizontal plane.

Another embodiment of the invention comprises a dovetail mount for retaining a removable dovetail rail, the dovetail mount being adapted to secure the removal dovetail rail to a panhead of an equipment supporting device, the dovetail mount comprising: a pair of opposed dovetail sides forming a dovetail track, at least one of said dovetail sides being movable; a movable locking lever; and an actuable coupling mechanism extending between the movable dovetail side and the lever; said locking lever being movable in a first direction for pressing the movable dovetail side toward the opposed dovetail side, thereby retaining the removable dovetail rail, said locking lever being movable in a second direction to move the movable dovetail side away from the opposed dovetail side in a horizontal plane, movement of the locking lever past a threshold point in the second direction further acting to lower the movable dovetail side through the horizontal plane, allowing the removable dovetail rail to be disengaged from the dovetail track, the actuable coupling mechanism comprising at least one movable arm pivotably coupling the locking lever to the movable dovetail side at a first pivot axis, and the camming arrangement comprises a catch and at least one trip lever pivotably coupled at a second pivot axis, said trip lever being disposed to engage said catch as said locking lever is moved past said threshold point in the second direction, said trip lever rotating about said second pivot axis to exert a force on said movable dovetail side to rotate the movable dovetail side about said first pivot axis to lower the movable dovetail side through the horizontal plane. In another embodiment, the trip lever is pivotably coupled to the movable dovetail side.

Another embodiment of the invention a dovetail mount for retaining a removable dovetail rail, the dovetail mount being adapted to secure the removal dovetail rail to a panhead of an equipment supporting device, the dovetail mount comprising: a pair of opposed dovetail sides forming a dovetail track, at least one of said dovetail sides being movable; a movable locking lever; and an actuable coupling mechanism extending between the movable dovetail side and the lever; said locking lever being movable in a first direction for pressing the movable dovetail side toward the opposed dovetail side, thereby retaining the removable dovetail rail, said locking lever being movable in a second direction to move the movable dovetail side away from the opposed dovetail side in a horizontal plane, movement of the locking lever past a threshold point in the second direction further acting to lower the movable dovetail side through the horizontal plane, allowing the removable dovetail rail to be disengaged from the dovetail track, the actuable coupling mechanism comprising at least one movable arm pivotably coupling the locking lever to the movable dovetail side at a first pivot axis, and the camming arrangement comprises a catch and at least one trip lever pivotably coupled at a second pivot axis, said trip lever being disposed to engage said catch as said locking lever is moved past said threshold point in the second direction, said trip lever rotating about said second pivot axis to exert a force on said movable dovetail side to rotate the movable dovetail side about said first pivot axis to lower the movable dovetail side through the horizontal plane, the catch being secured to the movable dovetail side.

Another embodiment of the invention further comprises a dovetail mount for retaining a removable dovetail rail, the dovetail mount being adapted to secure the removal dovetail rail to a panhead of an equipment supporting device, the dovetail mount comprising: a pair of opposed dovetail sides forming a dovetail track, at least one of said dovetail sides being movable; a movable locking lever; and an actuable coupling mechanism extending between the movable dovetail side and the lever; said locking lever being movable in a first direction for pressing the movable dovetail side toward the opposed dovetail side, thereby retaining the removable dovetail rail, said locking lever being movable in a second direction to move the movable dovetail side away from the opposed dovetail side in a horizontal plane, movement of the locking lever past a threshold point in the second direction further acting to lower the movable dovetail side through the horizontal plane, allowing the removable dovetail rail to be disengaged from the dovetail track, the dovetail mount further comprising at least one pair of mating rack and pinion gears secured to the removable dovetail rail and the dovetail track, whereby the position of the removable dovetail rail within the dovetail track can be adjusted by rotating the pinion before fixing the removable dovetail rail to the dovetail track.

Another embodiment of the invention comprises a quickly detachable battery power source including at least one battery having two terminals for powering electric functions of a panhead, the battery power source comprising; first and second leads adapted to be electrically coupled to the battery terminals; a housing for holding at least one said battery, said housing having a first end and a second closed end; and a closure for placement at the first end of the housing after insertion of the at least one battery, such that prior to fixed placement of the cylindrical closure at the first end of the housing, a voltage difference is not measurable across the first and second leads, and a voltage difference is measurable across the first and second leads after fixed placement of the closure at the opening of the housing. In another embodiment of the invention, fixed placement of the closure at the first end of the housing requires application of first force along an axis of the housing, followed by application of a second force along an angular direction relative to the axis of the housing, whereby the closure resists removal forces applied along the axis of the housing. Another embodiment of the invention includes an electronic panhead display package for displaying a readout corresponding to at least one angular displacement associated with a panhead, comprising such a battery power source and further comprising a processing unit and a backup power source, so that if the cylindrical closure is removed from the cylindrical housing, the backup power source will supply electrical power temporarily to the processing unit.

Another embodiment of the invention comprises a method for coupling a battery power source to a panhead to power electrical functions of the panhead, the method comprising the steps of providing a battery power source having a housing and having a first lead disposed at an end face the housing and a second lead extending from a side surface of the housing, linearly advancing the end face into engagement with the panhead, and rotating the battery housing to engage the leads with electrical connections of the panhead.

Another embodiment of the invention comprises a dutch roll head for providing a roll function to a camera, the dutch roll head being remotely actuable by a user, comprising: a roll axle disposed along a roll axis; a motor connected to the roll axle for causing rotation thereof about the roll axis; and a user grip adapted for mounting on a handle, whereby the grip may be used to move the handle; and an electronic interface element mounted on the user grip linked to the motor via an electronic link and adapted to be actuated by said user, whereby when said user actuates the interface element by a given amount, a signal is transmitted via the electronic link to the motor causing the motor to effect a rotation of the roll axle in an amount proportional to the given amount by which the user actuates the interface element. Another embodiment of the invention comprises such a dutch roll head wherein the interface element is selected from the group consisting of a sliding switch, a rotary switch, and a toggle switch.

Additional features and advantages of the invention will be made apparent from the following detailed description of illustrative embodiments, which proceeds with reference to the accompanying figures.

BRIEF DESCRIPTION OF THE DRAWINGS

While the appended claims will set forth the features of the present invention with particularity, the invention, together with its objects and advantages, may be best understood from the following detailed description taken in conjunction with the accompanying drawings of which:

FIG. 4a is a perspective view of a dutch roll head attachment according to an embodiment of the present invention for use atop a panhead;

FIG. 11 is a partial cross sectional side view of a dutch roll head attachment according to an embodiment of the invention, showing drag inducement, position sensing, and optional counterbalance locations;

FIG. 12a is a cross sectional side view of a quick-change battery pack in an assembled position according to an embodiment of the invention;

FIG. 12b is an exploded cross sectional side view of the quick-change battery pack in a disassembled position according to an embodiment of the invention;

DETAILED DESCRIPTION OF THE INVENTION

Figure 1:
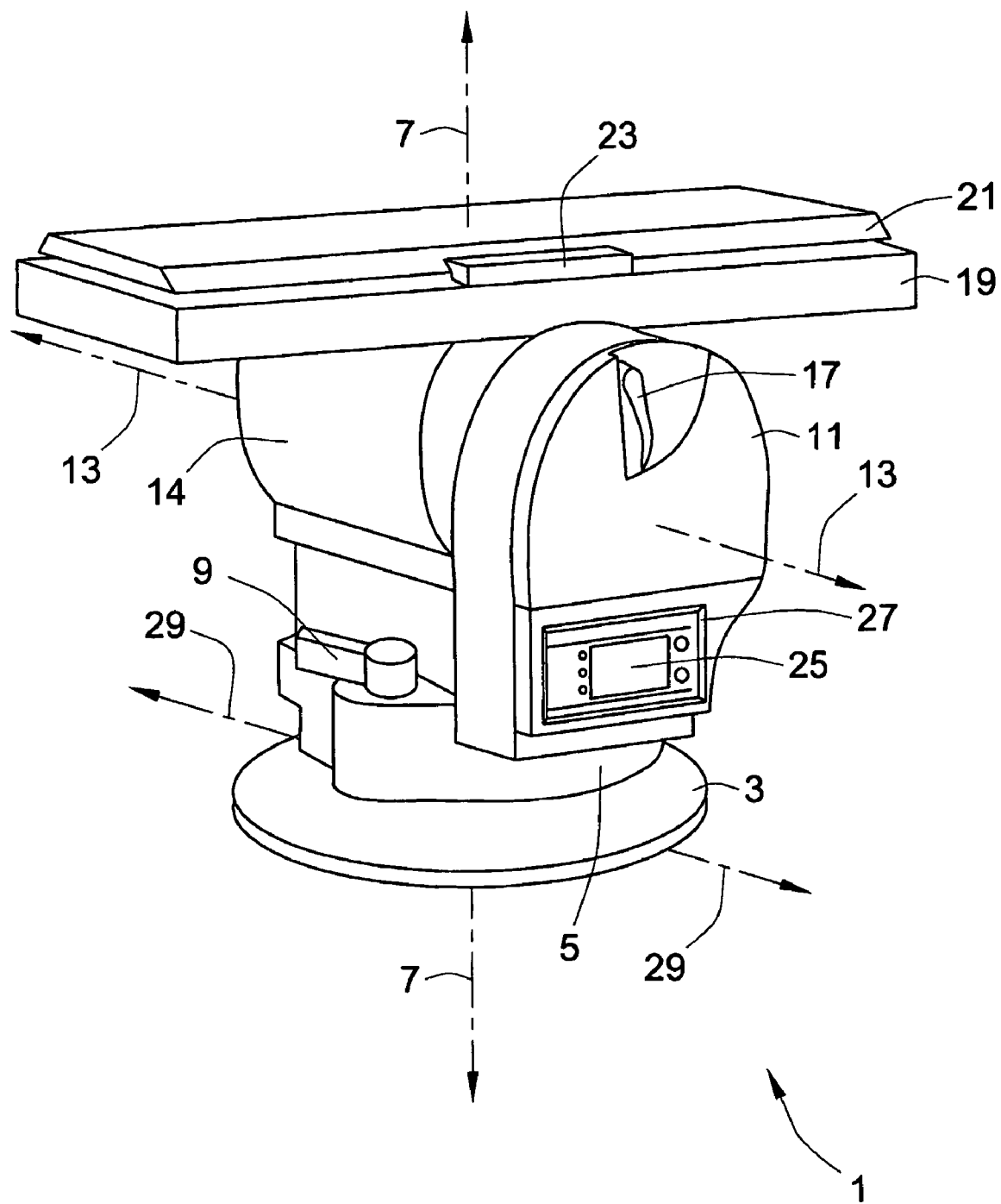
FIG. 1 is a perspective view of a camera panhead according to teachings of the present invention.

Turning to the drawings, wherein like reference numerals refer to like elements, the invention is illustrated as being implemented in accordance with teachings of the invention in a panhead as shown in FIG. 1. FIG. 1 shows a perspective view of a panhead 1 according to an embodiment of the invention. The illustration of FIG. 1 is generalized, and is intended to convey to the reader the general features and usage of the panhead in accordance with this embodiment. The panhead 1 consists of a base 3 that is mountable to a tripod or other support, that in turn rests upon the ground or floor. The remainder of the panhead, that is from housing 5 upward, is pivotable about a pan axis 7 that runs substantially through the center or central region of the base 3. This motion is damped and sensed, as will be discussed hereinafter. Locking lever 9 is operable to lock the panhead so that it does not move about the upright pan axis 7. It will be appreciated that the placement of this lever or any other control is not critical. Thus, for example, lever 9 may alternatively be located in a symmetric location on the opposite side of the head 1.

A housing 11 covers mechanisms related to the pivoting of the panhead about a tilt axis 13, the mechanisms running substantially horizontally through the center or central region of housing 11. The motion of the head 1 about this axis is also sensed and damped as will be discussed hereinafter. Locking lever 17 is operable to lock the head to prevent movement about tilt axis 13.

Situated at the top of the head 1 are structures to facilitate the mounting of a camera or other equipment to the head 1. In particular, a dovetail base 19 is fixed to the housing 11, while a dovetail platform 21 is fixable to the dovetail base 19 via two dovetail sides, one of which 23 is visible in FIG. 1, the other of which is symmetrically situated on the opposite side of the dovetail platform 21. Rather than mounting a camera directly to the dovetail base 19 via the dovetail platform 21, it is also possible to mount the camera to another attachment such as a dutch roll head as described herein, which is then mounted to the dovetail base 19.

It will be appreciated that the placement of a heavy camera atop the head 1 will create a significant downward force in the direction of pan axis 7 when the camera is situated directly over the tilt axis 13. It will be further appreciated that any deviation of the center of gravity of the camera from pan axis 7 will result in an increasing torsional load about tilt axis 13 as the deviation increases. Thus, when a camera or other instrument supported on the platform 21 (or a dutch head) is then tilted about the tilt axis 13, a significant and nonlinear restoring force is required to counterbalance the camera so that the operator is not required to constantly exert force to prevent the camera from pulling itself downward around tilt axis 13. In accordance with an important aspect of the invention, the head 1 is provided with a heavy-duty nonlinear counterbalance mechanism.

Figure 2A:
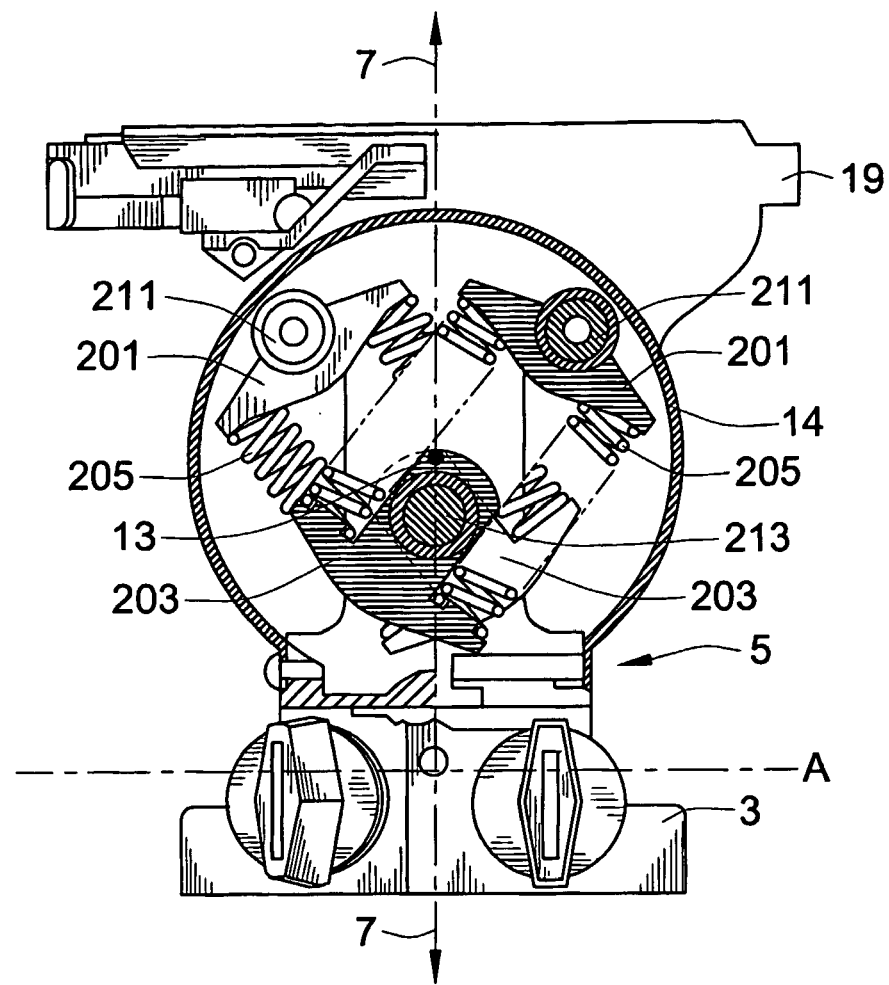
FIG. 2a is a cross sectional side view of a tilt axis counterbalance mechanism.
Figure 2B:
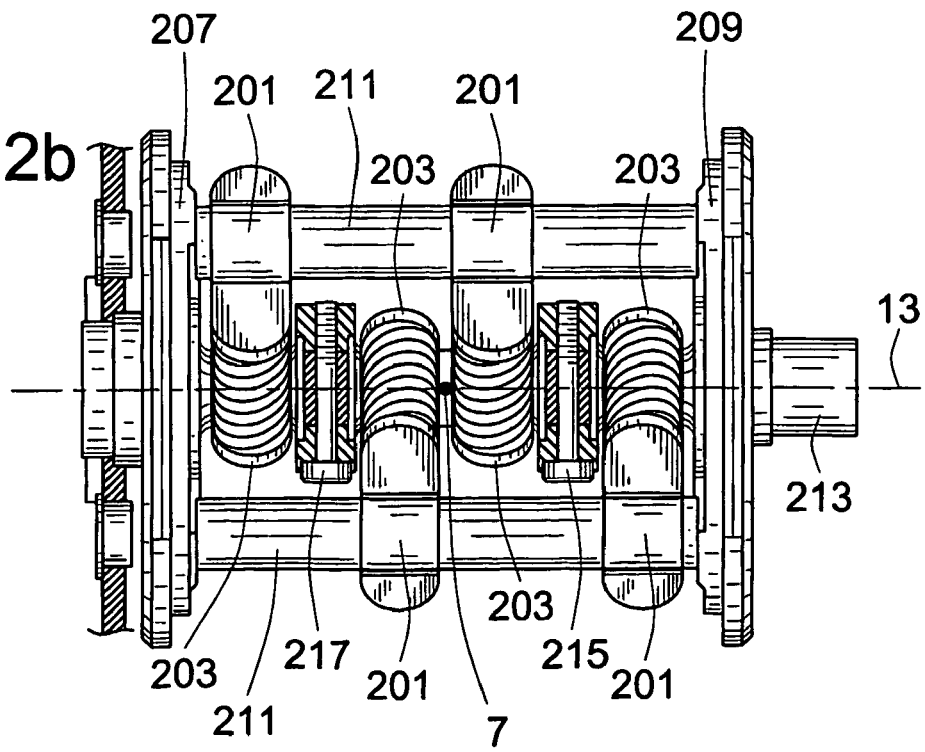
FIG. 2b is a partial cross sectional top plan view of the tilt axis counterbalance mechanism with the housing removed.

Referring to FIG. 2, the counterbalance mechanism according to an embodiment of the invention is shown. FIG. 2a shows a sectional side view of the counterbalance mechanism taken along tilt axis 13, while FIG. 2b shows a cut-away top view of the mechanism taken along pan axis 7, the tilt drum 14 having been removed. It will be appreciated that the tilt drum 14 defines a tilt axis about which it rotates. While the structure described herein is novel, the basic principle of operation of the counterbalance mechanism itself remains substantially the same as described in the '568 patent to O'Connor et al., previously incorporated by reference. Accordingly, the function will be described only in overview except for those portions that differ. For a more complete understanding of the geometrical principles involved during use of the head, the reader is invited to read the '568 patent, paying particular attention to the discussion of FIGS. 6-10.

Referring to FIG. 2a, the lower portion of the panhead can be seen, as well as the dovetail base 19 for supporting equipment atop the head 1. As described in greater detail in the '568 patent, the wiffle trees 201, 203 capture springs 205 in such a manner as to compress the springs more or less depending upon the position of the base 19 as the head is tilted. The reader is referred to FIGS. 8-10 of the '568 patent for a discussion of the forces in play during tilting of the head. Essentially, the nonlinear deformation of the springs 205 creates a nonlinear counterbalancing force to counter the nonlinear torsional force applied by the weight of the camera on the head during tilting.

However, for large heavy cameras, such as those weighing 200 pounds or more, the counterbalance force that the springs 205 must exert becomes immense. This creates a need for very powerful springs, each capable of exerting a restoring force of approximately 1000 pounds or more, but the use of such powerful springs tends to place large loads on the structural components of the head such as the rods 211 supporting the trees 201, 203. Additionally, the force required to adjust the counterbalance force by adjusting the position of the common rod 213 is greatly increased generally in proportion to the increase in spring strength.

The solution of the present invention is to employ strong yet compact compression springs, adapted to meet the large loads imposed, and being disposed in a novel arrangement to avoid damage to other components of the head. In particular, in order to minimize the weight of the finished head, it is desirable to use hollow steel rods 211, 213, produced from 4130 heat-treatable alloy steel or other high strength steel or alloy. The reason for using hollow steel rods is that other lightweight metals such as aluminum typically do not possess the structural strength of heavier metals such as stainless steel, chrome molybdenum alloys, and other alloys.

Even so, in order to reduce the weight of the head while accommodating the structural loads imposed by the strong springs used, it is desirable to reduce the permissible size of the rods by arranging the spring loading to reduce the exerted rod bending moment. Referring to FIG. 2b, an exemplary wiffle tree arrangement according to the present invention is shown. In particular, the illustrated arrangement is devised to minimize bending moments by minimizing the distance between oppositely acting force centers on the most susceptible elements, i.e. rods 211, 213.

Two support towers 215, 217 for the common rod 213 are provided, approximately symmetrically placed on rod 213, extending downward in the direction of pan axis 7. It will be appreciated that the dual tower arrangement is also particularly suitable for use in an application such as this, where extremely high force springs are utilized. The bending moment applied to the common rod 213 is reduced by providing the dual support towers 215, 217, thus reducing the necessary size and weight of the common rod 213. To readily adjust for equipment of varied weights, these towers are vertically adjustable to adjust the position of the common axis or rod 213. This way, the operator may adjust the counterbalance force provided (according to the basic principles set forth in the '568 patent, already incorporated herein by reference in its entirety).

The spring assemblies are arranged as shown, so that the support towers are placed between oppositely extending wiffle tree and spring assemblies, which are disposed at an angle with respect to pan axis 7. Additionally, the wiffle trees and support towers are disposed in a relationship that minimizes the bending moments, and, therefore, stresses along the shafts. More specifically, the wiffle tree pairings are identical, rather than mirror images of each other across the center of the head along the tilt axis as in the prior art. That is, the wiffle trees are disposed in a staggered fashion as opposed to symmetrically about a central support tower, as disclosed in the '568 patent. In this way, the two central wiffle tree assemblies place the greatest bending load on their respective wiffle tree support rods 211. However, unlike the prior art, the other wiffle tree assembly on each support rod 211 provides minimal additional bending load because each is placed adjacent a support point, i.e. end wall 207 or end wall 209. With respect to the loads experienced by common rod 213, the bending loads are also minimized by the illustrated configuration. In particular, lower wiffle tree supports 203 are placed so as to minimize the distance between them and any adjacent support points such as support towers 215, 217 or end walls 207, 209. In addition, the close spacing of opposing lower wiffle tree supports 203 minimizes the local twisting moment resulting from pairs of oppositely directed horizontal force components applied on rod 213 by adjacent lower wiffle tree support pairs. In other words, the staggered positioning of the wiffle tree supports 201, 203 along the respective support rods 211 and common rod 213 minimize the resulting bending moments exerted by the two centermost wiffle tree supports 201, 203.

Figure 13:
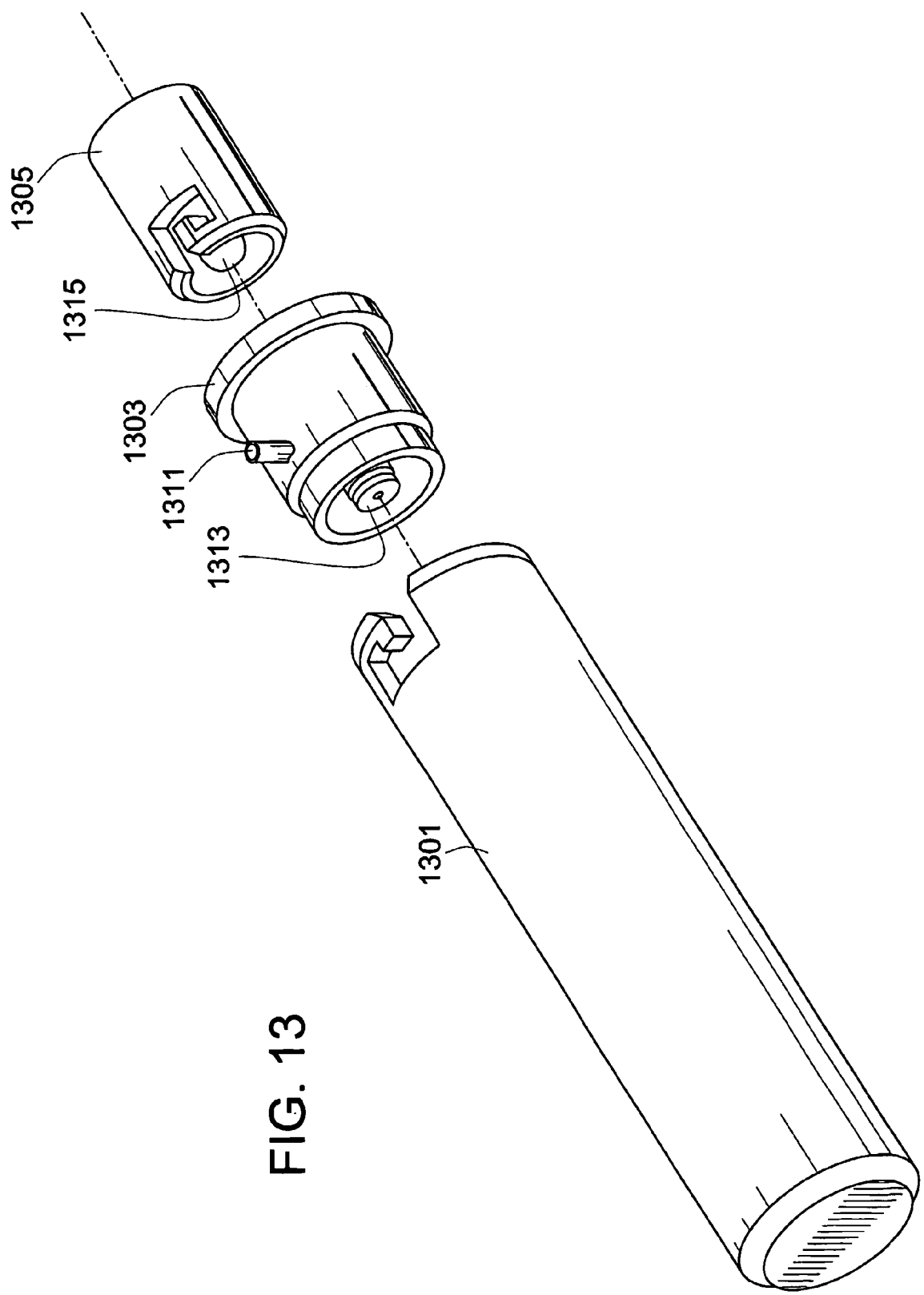
FIG. 13 is an exploded perspective view of the quick-change battery pack in a disassembled position according to an embodiment of the invention.

Note that the foregoing discussion describes a preferred arrangement for two pairs of spring assemblies used in counterbalancing, however, the two pairs of spring assemblies may alternatively be arranged in another configuration. Exemplary alternative configurations are shown in FIGS. 12 and 13 of the '568 patent (for two spring assemblies) already incorporated herein, and are described in the related discussion in the '568 patent. Given the disclosure herein, one of skill in the art will appreciate that the same mechanisms may be adapted for the use of two pairs of spring assemblies.

Figure 3:
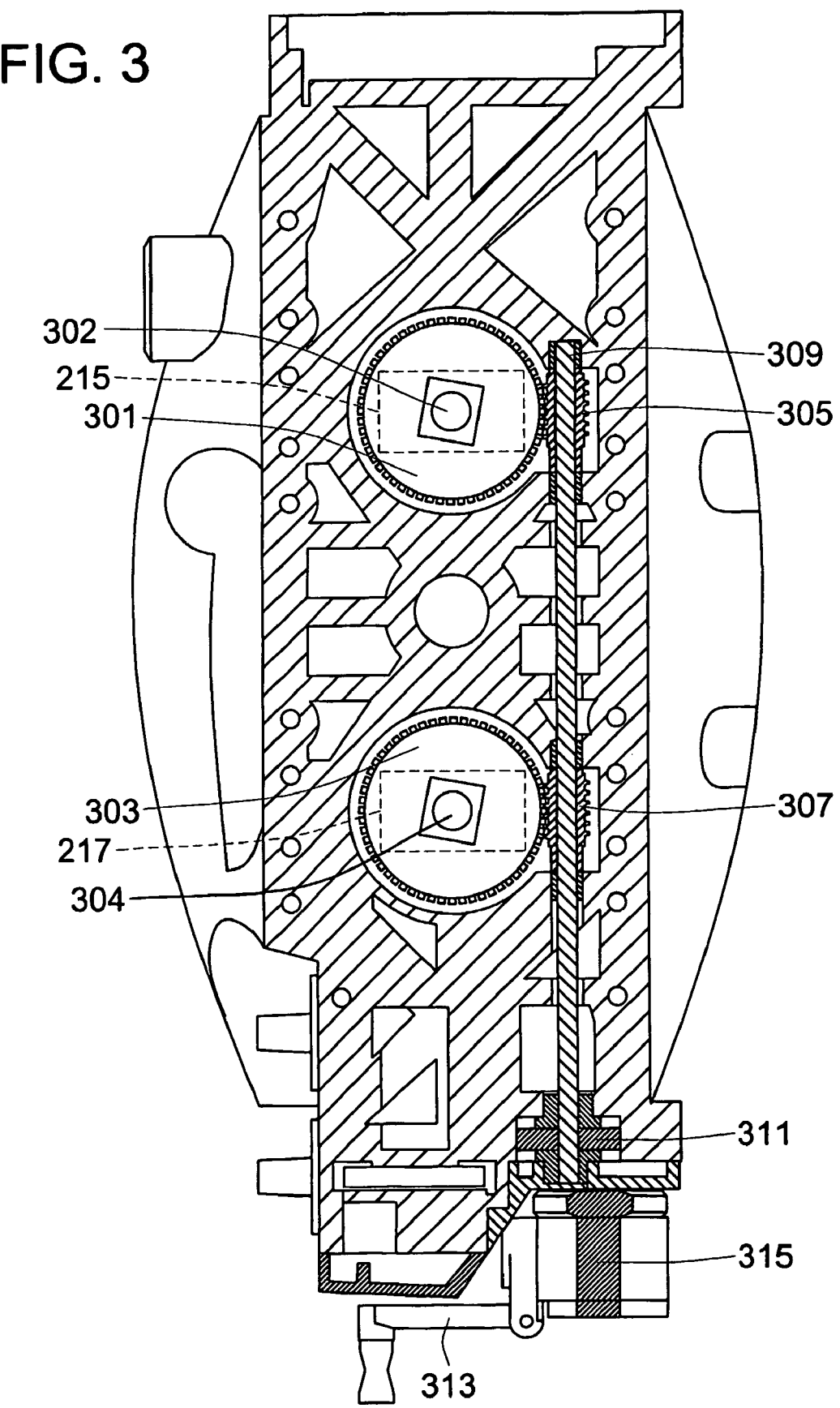
FIG. 3 is a cross sectional top view of the tilt axis counterbalance adjustment mechanism.

FIG. 3 illustrates an exemplary mechanism by which the support towers 215, 217 of FIG. 2 may be adjusted upwardly and downwardly along pan axis 7 without the application of undue force by the operator. In particular, FIG. 3 illustrates a partial cross sectional view of the panhead at line A taken along pan axis 7 of FIG. 2a. It can be seen that support towers 215, 217 are centered on circular gears 301, 303. Respective threaded shafts 302, 304 fixed to each of gears 301, 303 extend perpendicular to each gear's major plane and extend threadably into each of support towers 215, 217. Thus, a turning of the gears 301, 303 results in a raising or lowering of the support towers 215, 217. Even though this relationship provides a certain leverage advantage depending upon the thread pitch of the threaded shafts 302, 304 fixed to the circular gears 301, 303, the strength of the springs 205 is such that greater leverage may be needed by many human operators. Accordingly, the gears 301, 303 are driven and coordinated via respective worm gears 305, 307, attached to a common shaft 309. Thus, in accordance with an important feature of the invention, the rotation of the common shaft 309 results in the substantially identical, simultaneous movement of the support towers 215, 217. A further gear reduction is provided by a spur gear 311 attached to shaft 309 and indexed to a pinion gear (not visible in this view). One exemplary gearing arrangement will be discussed in greater detail below with respect to FIG. 7.

The pinion gear is attached to a common shaft 315 that also carries a handle 313 that may be manipulated by an operator. The handle also preferably further includes an exposed socket on a common axis with the shaft 315, allowing the handle to be alternatively turned via an electric screwdriver or other rotary tool. This feature may aid the operator when there is insufficient time to turn the handle by hand the required number of turns to provide the necessary counterbalance.

It will be appreciated that rotation of the handle 313 will cause a rotation of gears 301, 303, and a subsequent coordinated raising or lowering of support towers 215, 217. In turn, the raising or lowering of the towers compresses the springs 205 to a greater or lesser degree, providing varying degrees of nonlinear counterbalance force to counter the tilting of the head about tilt axis 13.

To provide a third degree of movement and adjustment, a dutch roll head may optionally be used in conjunction with the panhead. A dutch roll head rotates about a third axis, typically referred to as the roll axis. A roll axis is one that is substantially parallel with the camera sight line axis, although the two need not be co-linear. FIG. 4 illustrates a roll head assembly 401. The roll head 401 comprises a base 403 fixable to the top of the panhead previously discussed by for example a dovetail mount, and pivotally fixed to roll platform 405 at roll axis 407. Roll axis 407 preferably coincides with camera axis 409, although it is sufficient that both axes are simply substantially parallel.

According to an important feature of the invention, however, the center of gravity of the mounted camera and roll platform 405 is disposed along the roll axis 407. In this way, the equipment balance of the head 1 remains unaffected by the roll of the equipment mounted on the dutch roll head 401. In order to facilitate adjustment of the height of platform 405, both to assure necessary clearance with the base 403 and to place the center of gravity of the platform 405 and camera along the roll axis 407, the platform 405 is movable up and down in the direction of axis 415. The base 403 is illustrated as being slotted to permit rod 413 to be moved vertically. However, other techniques for allowing vertical movement may also be used. For example, the platform 405 may be vertically movable with respect to rod 413. In any case, the movement of the platform 405 alone or the platform 405 and rod 413 is linearly constrained, as along a dovetail mount or along a track made of two rods.

While alternative mechanisms may be used to allow vertical movement of the platform 405, a rack and pinion, screw, or other suitable mechanism is preferably employed to reduce the force needed to adjust the position of the camera and platform 405. Such mechanism may be hand-operated, such as via a crank or other actuator. Alternatively, the mechanism may be motorized, such as thru the use of an electric motor geared to controllably alter the vertical position of the camera and platform 405, as will be appreciated by those of skill in the art. An exemplary geared vertical adjustment mechanism is illustrated in FIG. 3 for adjusting the counterbalance force, and a similar mechanism can be used for any other vertical adjustment such as for adjustment of the roll head. Additionally, a lock 417 is provided so that the platform 405 may be fixed in the desired position. The lock may employ compression of dovetail sides, or may use any other mechanism such as a setscrew with a knob head.

A handle 411 is preferably fixed to platform 405 via shaft 413, the shaft 413 being coaxial with roll axis 407 and usable to pivot the platform 405 about the roll axis 407. Within base 403, several mechanisms are preferably attached to shaft 413. In particular, it may be desirable to provide an adjustable counterbalance mechanism on shaft 413 to laterally counterbalance the camera weight using the same principles discussed above to provide counterbalance on the tilt axis. Such counterbalance will, however, typically not be required if the camera center of gravity is placed as described above. Additionally, a drag mechanism is preferably indexed to shaft 413 within base 403 so as to allow for smooth camera movement about the roll axis 407. These elements will be discussed in greater detail hereinafter. The base 403 may be fixed to the panhead using any suitable mechanism, but it is preferable that attachment be by way of the dovetail platform to be discussed in greater detail below.

The degree of roll attainable depends upon the dimensions of the camera, in that interference between the camera and the base 403 will determine the limits of travel. Base 403 preferably exposes other controls usable to affect the roll behavior of the camera. In particular, such controls preferably include a lock 417 to prevent roll movement of the camera about the roll axis, and a drag adjustment 419 to adjust the amount of drag about the roll axis 407. A mechanical drag indicator 421 may also be exposed on base 403, and/or an electrical output may supply the drag information along with counterbalance adjustment information if counterbalance is used, and encoded roll position information. If counterbalance is used, base 403 preferably also exposes a counterbalance adjustment control as discussed with respect to the tilt axis counterbalance mechanism.

Figure 4B:
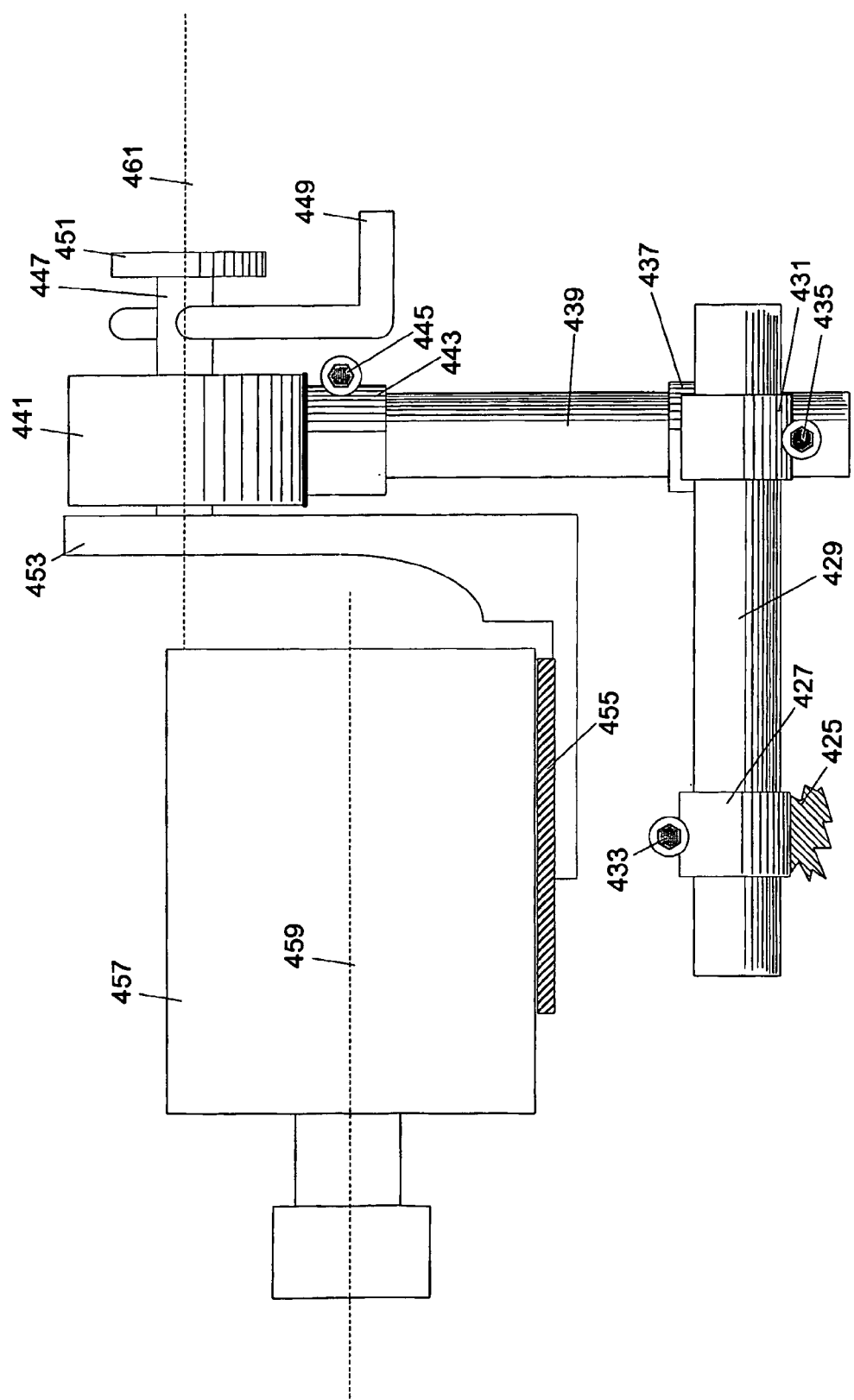
FIGS. 4b-d are side views of a dutch roll head attachment according to an alternative embodiment of the present invention for use atop a panhead according to an embodiment of the invention, wherein the dutch roll head is shown in varying degrees of adjustment.
Figure 4C:
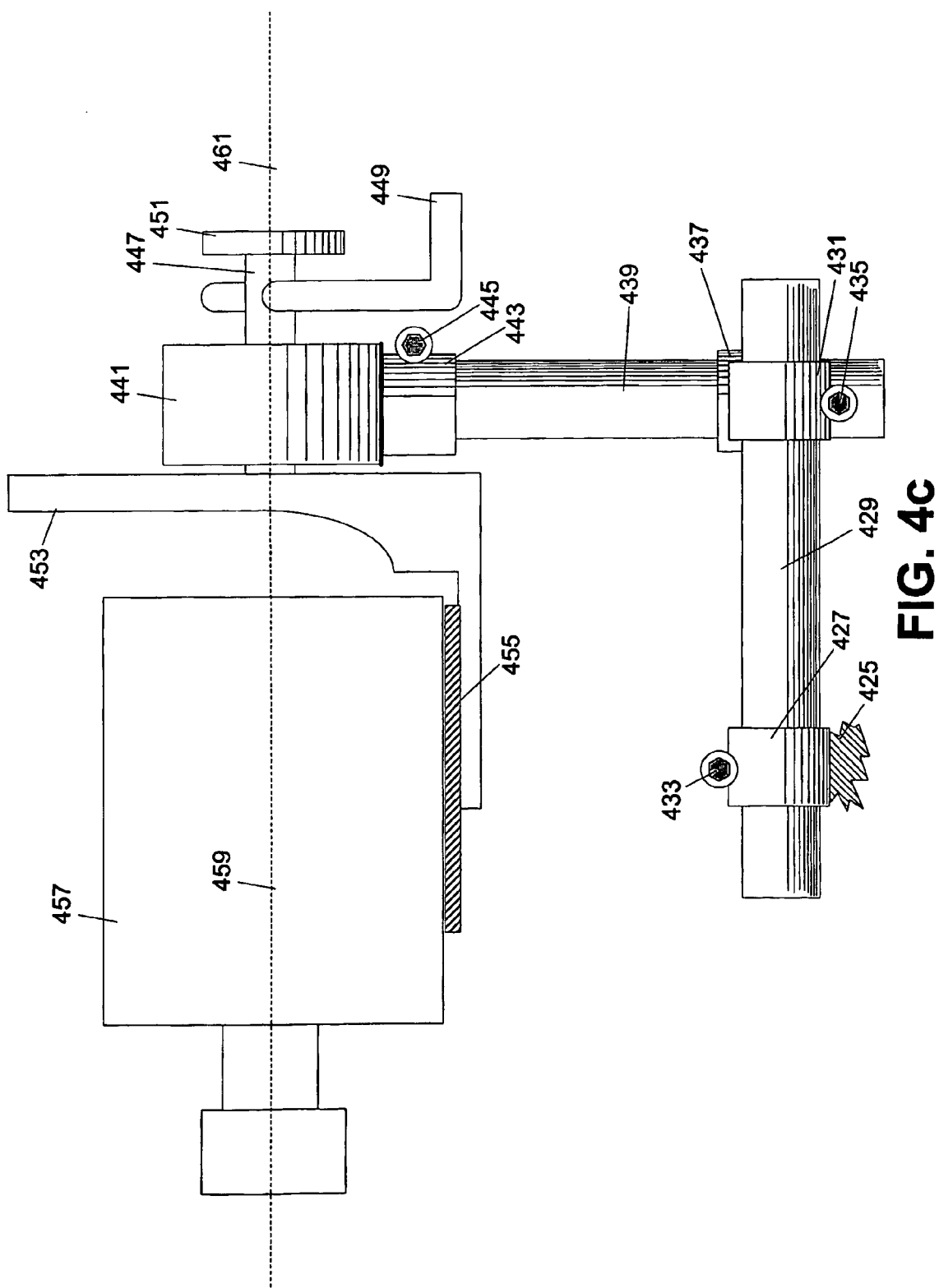
Figure 4D:
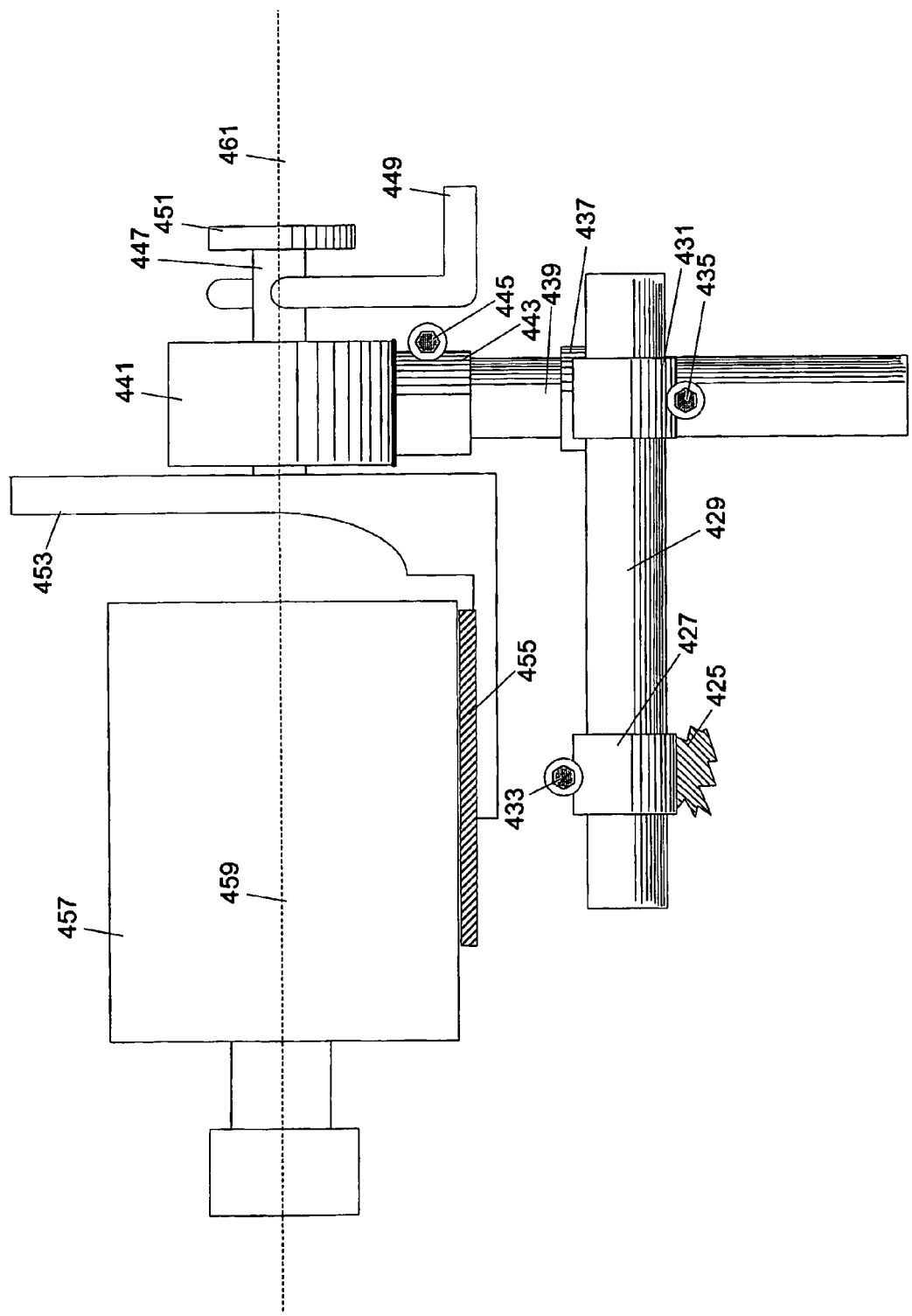

An alternative dutch roll head arrangement is shown in FIGS. 4b-d. As with the previously discussed embodiment, a base 425 is provided for attachment to a head as described herein or otherwise. The base comprises or is attachable to a first socket 427 for receiving a horizontal support tube 429. A second socket 431 also receives horizontal support tube 429. Each of sockets 427 and 431 are fixable in relation to horizontal support tube 429 via a clamping action facilitated by bolts 433 and 435 respectively, or otherwise. Second socket 431 has a perpendicularly oriented third socket 437 fixed thereto for receiving a perpendicularly oriented vertical support tube 439. A clamping bolt (not shown) is usable to fix the vertical support tube with respect to the third socket 437, in a similar fashion as bolts 431 and 433.

In order to further couple a roll head support 441 to the base 425, a fourth socket 443 is secured to the roll support 441 and fixed atop the vertical support tube 439 via the fourth socket 443, and via a clamping action provided by a clamping bolt 445. The roll head support 441 rotatably supports an axle 447 having a roll handle 449 optionally coupled thereto on one side. The handle 449 may be disposed in a hole in axle 447 and fixed in place via a set screw 451, although other attachments are envisioned. On the other side of the roll head support 441, the axle 447 is attached to a roll platform 453, to which is attached, via screws or otherwise, a camera base 455. A camera 457 is mounted to the camera base 455. It will be appreciated by those of skill in the art that dutch rotation or roll of the roll platform 453, camera base 455 and the camera 457 will occur about the axis 461 defined by axle 447. In this embodiment, an axis 459 including the center of gravity of the camera 457, the camera base 455 and the platform 453 is conveniently illustrated as coinciding with the sight line 459 of the camera. Thus, those of skill in the art will appreciate that it is desirable to align the axis 459, which includes the center of gravity, and, here, the sight line, with the dutch rotational axis 461.

FIG. 4b illustrates a possible initial mounting position of the camera and the elements of the dutch head before adjustment of the roll axis. FIGS. 4c-d illustrate further adjustments to better align the axis of the center of gravity 459 of the camera (about which no gravitational tilt moment is exerted) with the roll axis 461 about which axle 447 rotates. As shown in FIG. 4c, the roll platform 453 is first raised vertically so that the central gravitational axis 459 of the camera substantially coincides with the roll axis 461 of the roll head 441. This adjustment may be allowed and then fixed via a set screw or other means, fixing the roll platform 453 in relation to the axle 447. Subsequently as shown in FIG. 4d, the camera is lowered (to attain a lowest possible center of gravity for stability) while maintaining the registration between the central axis 459 of the center of gravity and the camera and the roll axis 461 of the roll head assembly. This is done by loosening the clamping bolt (not shown) associated with socket 437 and lowering vertical support member 439 until further substantial adjustment would cause interference between the roll platform 453 and any other member of the dutch roll head or of a pan head to which the dutch roll head may attached. After adjustment, the clamping bolt associated with socket 437 is retightened. Note that the alternative dutch roll head shown in FIGS. 4b-d preferably embodies all the same tilt locks, sensors, indicators, outputs, drag adjustment mechanisms, etc. as the head shown with reference to FIG. 4a.

Further, note that the vertical adjustment mechanisms described with respect to FIG. 4a may likewise be applied to the roll head arrangement shown in FIGS. 4c-d. For example, the vertical movement of the platform 453 and base 455, and accordingly the camera 457 may be geared due to the extreme weight of the camera 457, and such gearing may be actuated either manually, such as via a crank, or automatically such as via a geared electric motor. By way of further example, a gearing mechanism that can be either manually actuated, or driven by a power screw driver or the like may be provided. Alternately, a drive motor may be provided. It will be appreciated that the various mounting and adjustments may also be provided in accordance with the spirit and teaching of the invention.

Figure 4E:
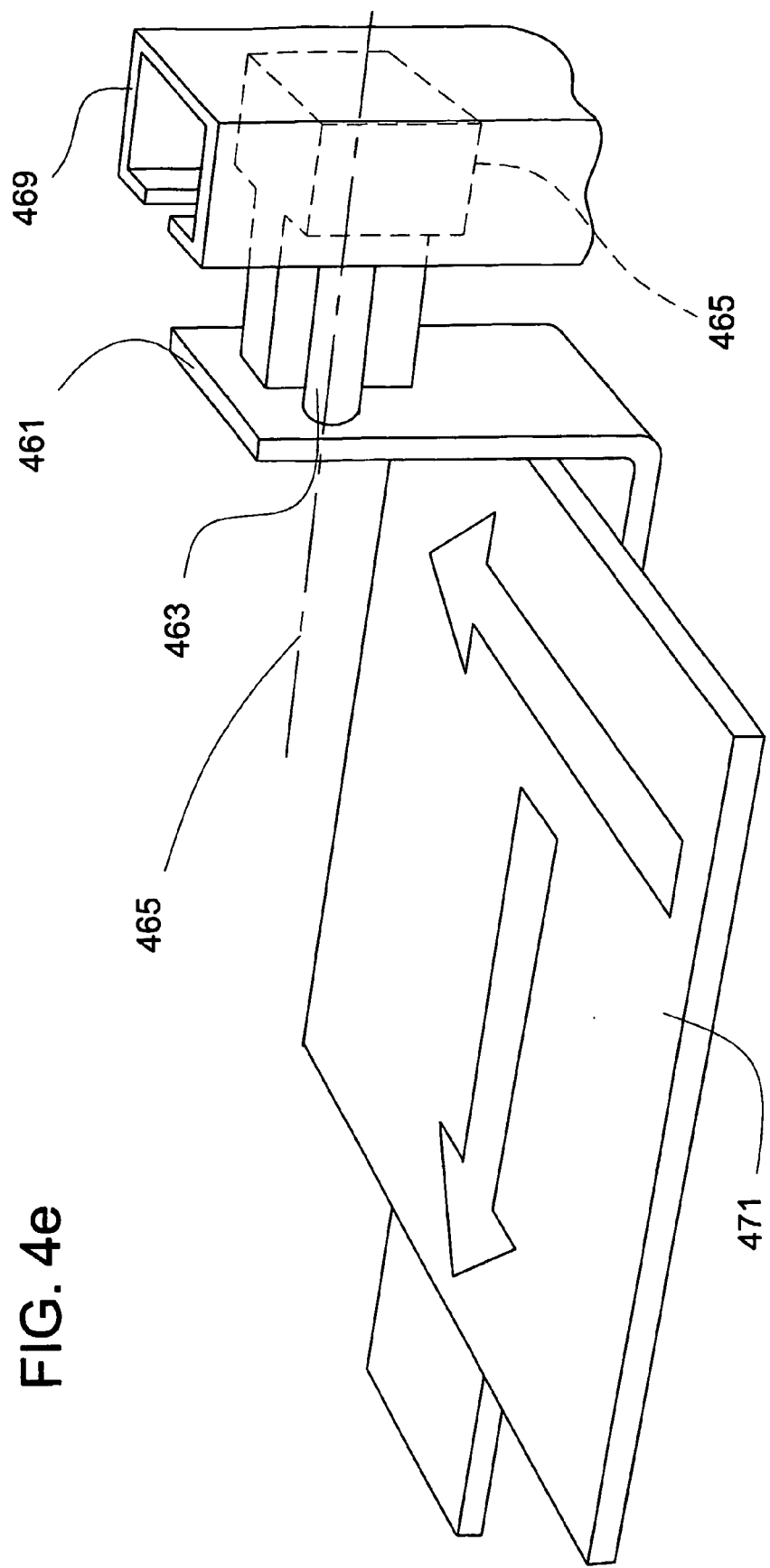
FIG. 4e is a perspective view of a dutch roll head attachment according to an alternative embodiment of the present invention for use atop a panhead according to an embodiment of the invention.

An alternative roll platform adjustment mechanism is shown in FIG. 4e. In particular, the roll platform 461, which is pivotable about the roll axis 465 at axle 463, is vertically adjustable via a slide 467 retained within a rectangular tube 469. The fit between the slide 467 and the tube 469 is preferably such that the slide cannot move substantially in lateral dimensions, but may move vertically within the tube 469 for adjustment. Additionally, as with the other embodiments, the camera platform 471 is adjustable fore and aft, such as in a direction parallel to the roll axis 465, and is also adjustable laterally, or side-to-side. In this manner, the center of gravity of the camera and platform may be adjusted so that they do not exert a roll moment or a tilt moment. Such fore and aft and lateral adjustment is preferably, but not necessarily, effected by way of a dovetail slide and mount disposed along each direction. Once the vertical, fore and aft, and lateral positions of the camera are set, the movement of the platform in each dimension is preferably lockable so that the balance of the camera package does not change during use.

Figure 17:
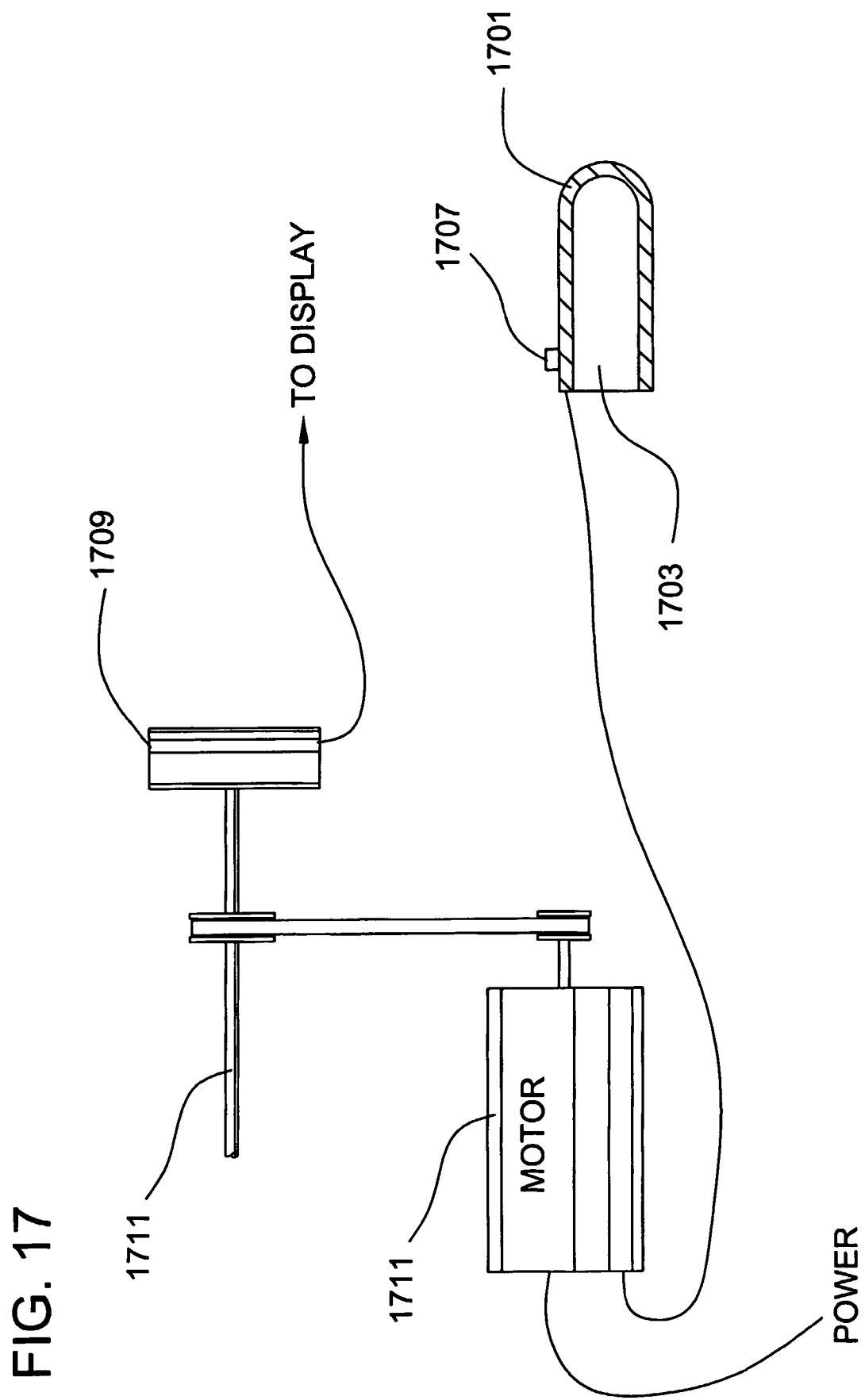
FIG. 17 is a schematic diagram of a remote dutch roll head control system according to an embodiment of the invention.

Referring now to FIG. 17, an optional motor drive and actuator for the dutch roll head is shown schematically. In this embodiment, a user actuated actuator grip 1701 is mountable on a handle, such as a pan handle, usable to pan the camera on the pan head as described elsewhere herein. The grip 1701 may be mounted by clamps, friction fit, or otherwise. For example, the grip may have a cavity 1703 that cooperates with the exterior of a tubular handle to secure the grip 1701 to the handle.

The grip 1701 is electrically connected to a motor 1705. A switch 1707 on the grip 1701 allows the user to actuate the motor in either direction, and preferably at a rate that is proportional to the user induced displacement of the switch 1707, such as by sliding, toggling, or rotation. The motor 1705 is geared to an axle 1711 at the roll axis, such as axle 413 of FIG. 4a, such that the actuation of the motor 1705 causes the roll platform, and hence the camera package, to roll about the tilt axis. The gearing of the motor to the tilt axle may be by belt drive, chain drive, or geared drive, and preferably should use reduction gearing both to allow the motor to more easily adjust the roll, and to allow greater precision of movement. Note that the other functions of the roll head, such as position measurement through a rotary encoder 1709, are preferably employed within this embodiment as well.

Using the actuator grip as described above, a user can pan, tilt, and roll the camera package using only one hand. This provides a smoother camera operation and eases the task of the camera operator. Additionally, the user's other hand can then be used to actuate other desired functions, such as drag adjustment, axis locks, and so on.

The mechanisms for adjusting the drag on each axis will now be discussed. As mentioned previously, providing a certain amount of drag on a given axis of rotation will tend to smooth the movement about that axis, eliminating camera overshoot and unsteadiness. Because cameras and operators differ greatly, it is desirable to provide an adjustment mechanism whereby the amount of drag may be preset or modified. The '568 patent, already incorporated by reference in its entirety, discloses the basic principle of viscous drag mechanisms, and the reader is referred to that patent for a full discussion of such mechanisms. The present invention utilizes the basic principles set forth in that patent, but utilizes an improved mechanism to actuate the drag sectors.

Figure 6:
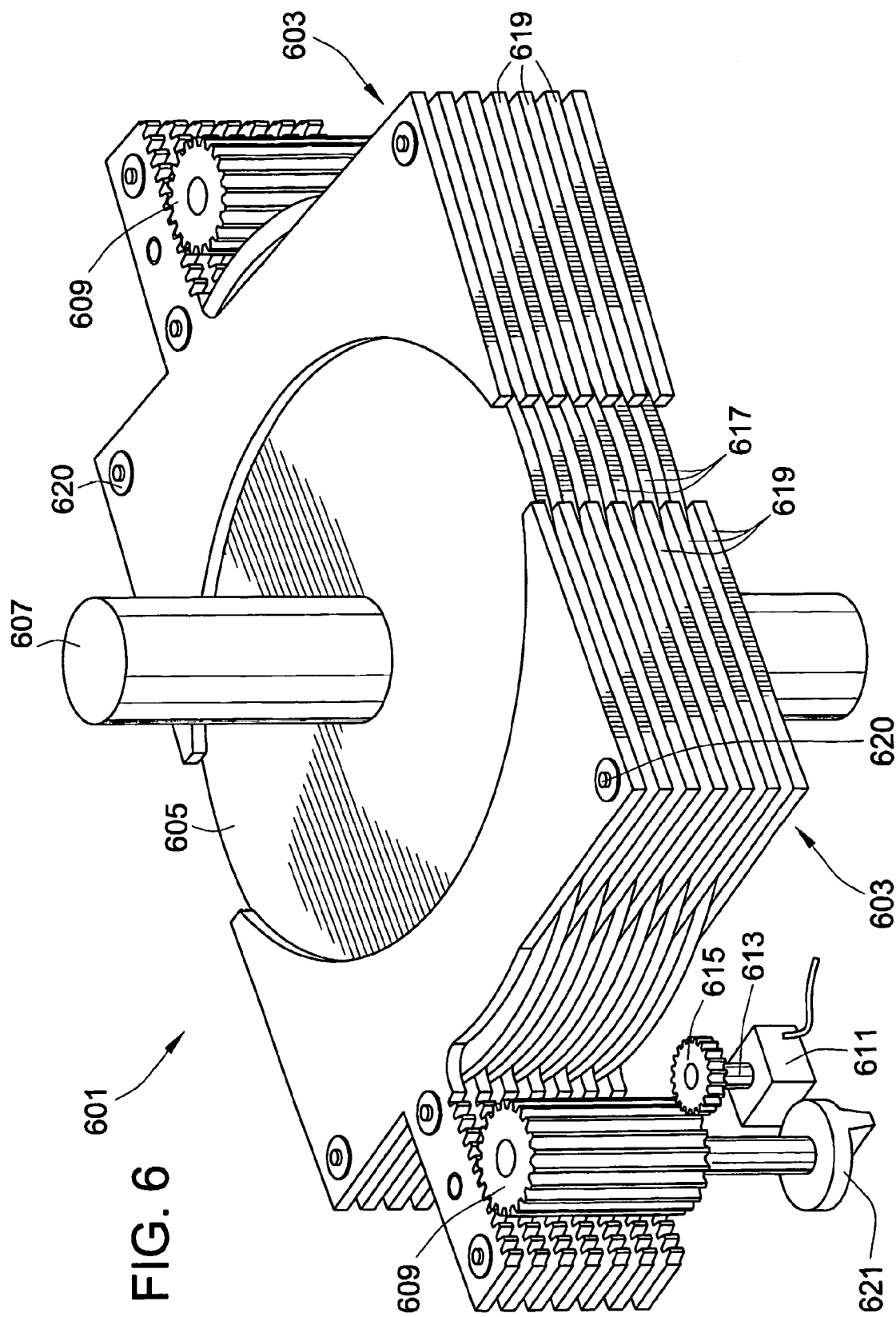
FIG. 6 is a perspective view of an adjustable drag inducing mechanism according to an embodiment of the invention.

Referring to FIG. 6, a schematic view of an exemplary viscous drag mechanism 601 is shown. The drag assembly 601 includes a number of drag sector assemblies 603 and a drag disc assembly 605. The drag sector assemblies 603 are mounted so as to be movable linearly along a radius of the drag disc assembly 605. The individual stacked discs 619 of the drag disc assembly 605 are fixed to a shaft 607. In this way, when the shaft 607 rotates, the drag disc assembly 605 rotates as well.

The individual elements 619 of each of the drag sector assemblies 603 are appropriately fixed relative to each element 619 in a given drag sector assembly 603 by rods and spacers 620 or other appropriate mechanism. The individual elements 619 in turn are interleavably related to the drag disc assembly 605. In turn, the drag sector assemblies 603 are actuated in a coordinated fashion by gears 609 which are manipulated by a user through a knob 621 or other mechanism. Thus, as the user turns the adjustment knob 621, the drag sector assemblies 603 become symmetrically more or less interleaved with the drag disc assembly 605 depending upon the direction in which the knob 621 is turned. Note that although a direct connection is shown between knob 621 and gear 609, any alternative actuating arrangement may be used. For example, the knob 621 may drive a worm, which drives a worm gear, which is geared to gear 609.

The spaces between stacked discs 617 of the drag disc assembly 605, between the stacked individual elements 619 of the drag sector assemblies 630, and between the stacked discs 619 and individual elements 619 are filled with a viscous fluid. A greater level of interleaving will create a stronger viscous drag on the drag disc assembly 605 and hence on the shaft 607. Likewise, a lesser degree of interleaving will lessen the amount of drag associated with the rotation of shaft 607. The reader is referred to the '568 patent and U.S. Pat. No. 3,822,769 to O'Connor, hereby incorporated by reference in its entirety for all that it teaches, for a fuller discussion of the drag-producing interaction and environment.

The gears 609 are coordinated by interceding gears, chain and cogs, or other suitable mechanism for coordinating their movement, so that the assemblies 603 move symmetrically with respect to disc 605. Although two drag sector assemblies 603 are shown for clarity, any number of such assemblies may be employed. In another embodiment, only one such drag sector assembly and one such disc 605 are provided for each axis. In this presently preferred embodiment, the drag sector assemblies 603 each comprise 23 sector pieces 619 with 22 spacer elements (see 620) located between the sector pieces 619, and each disc 605 comprises 22 disc elements 617 spaced apart by 21 spacer elements (not visible) along shaft 607.

Having described the mechanical aspects of the invention in detail above, the electrical features of the panhead according to the invention will now be discussed. In accordance with an important feature of the invention, the position of the panhead 1 with regard to the degree which the mounted equipment is rotated about the pan axis 7, and/or tilted about the tilt axis 13, and/or the dutch head roll axis 461 may be directly read by the user. In this way, a given shot may be recorded or read for later duplication, for example, or for special effects applied based upon a given position of the equipment. In overview, the electrical features provided facilitate the measurement and reporting of camera position and adjustment settings. Other electrical features such as backlighting for camera level indicators are also preferably provided. In order to electronically sense the position of the panhead 1, rotary encoders are positioned within housings 5 and 11 (and dutch roll head, if utilized), as will be discussed more fully hereinafter. The sensed positions are converted to electronic data digitally displayable on graphical user interface panel 25 (as shown, for example, in FIG. 1). The electronic module 27 of which the graphical user interface 25 is a part also preferably comprises buttons and switches usable to interact with the module to control features of the display or other features such as head level backlights, as well as electrical inputs and outputs.

Figure 5:
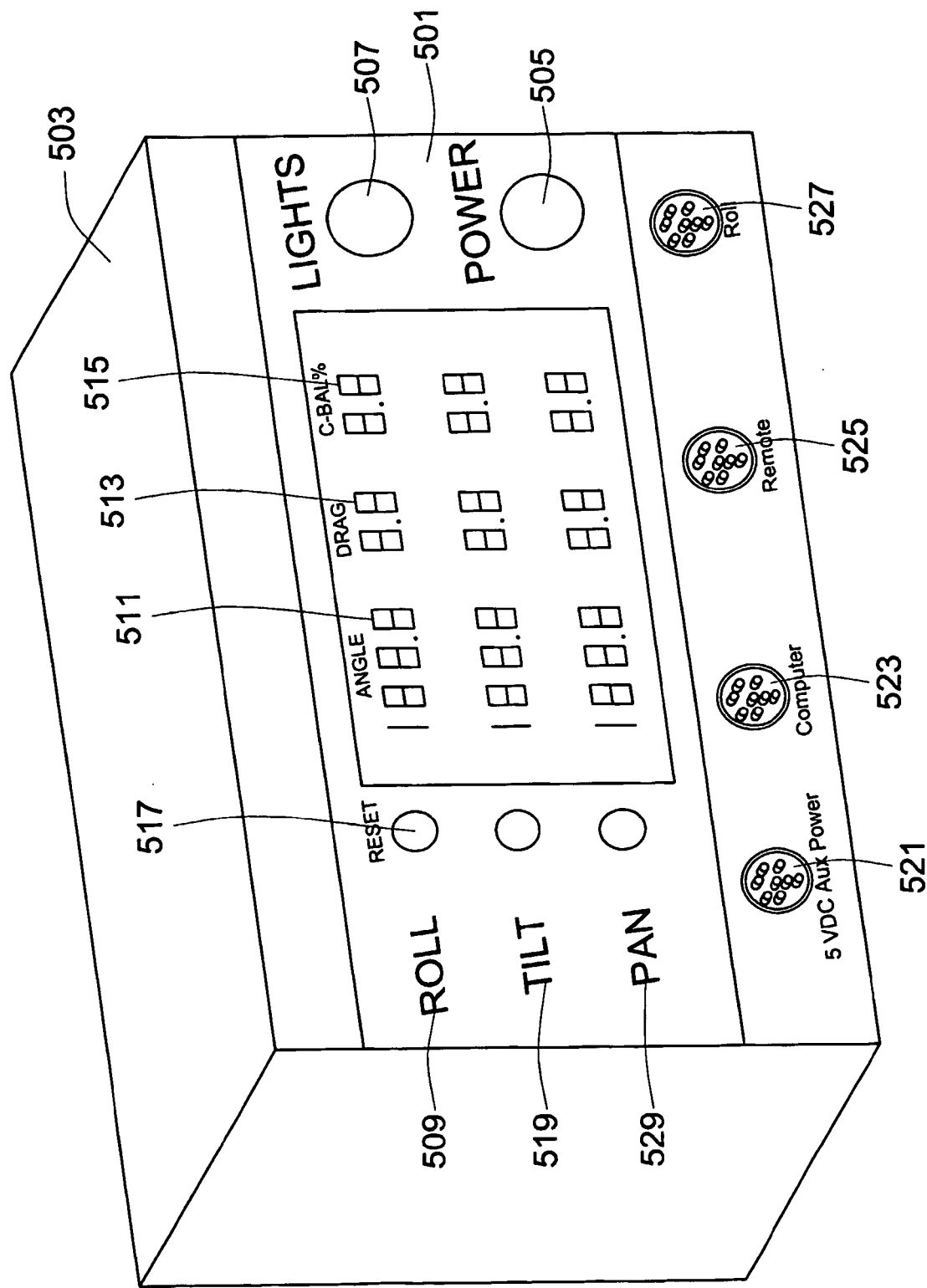
FIG. 5 is a perspective view of an electronic module including a digital display according to an embodiment of the present invention.

FIG. 5 illustrates an exemplary graphical user interface for allowing an operator to observe measurement data and to affect the operation of the electronic features. Note that all measurement data may also or alternatively be fed to the camera or image storage device itself, so that the camera position will be stored in direct association with the captured image at any point in time. Panel 501 is part of electronics module 503. In addition to the panel 501, the electronics module 503 also exposes electrical contacts, preferably LEMO connectors, for providing and receiving electrical power and signals. Within module 503 are standard electrical circuits to receive, convey, and process information to provide the indicated outputs and displays.

More specifically, panel 501 comprises a power button or switch 505 for turning on and off the power to the electronics module 503. Another button or switch 507 is operable to turn on and off certain lights. Such lights may be, for example, back-lights, such as LEDs used to enhance the readability of liquid bubble level devices mounted on the head which are usable to level the camera on one or more axes.

Further, panel 501 also comprises display elements related to the position of each axis as well as the drag setting for each axis and any counterbalance setting for each axis. Thus, for example, row 509 displays information related to the roll axis, such as head angle 511 on the roll axis, drag setting 513 for the roll axis, and counterbalance setting 515 for the roll axis. A reset button 517 is preferably provided for each axis to allow the operator to set the current angle as zero, so that subsequent angle measurements may be taken from that point. The display rows for the tilt 519 and pan 529 axes expose the same features and functionality, keeping in mind that a given axis may omit certain features. For example, it will not be typical to provide a counterbalance or associated counterbalance adjustment reading for the pan axis, but such may be provided.

The LEMO connector ports exposed by the electronics module preferably include a 5 volt auxiliary power input 521, a computer output 523, a remote output 525, and a roll head input 527. Although batteries typically power the electronics module, the 5 volt auxiliary power input 521 allows the operator to optionally power the electronics module via an external 5 volt DC power source. The computer output 523 provides the information collected and displayed in the form of a digital data stream to be received by a separate computer through a serial port or otherwise, so that the positions and settings of the head may be tracked and stored in the computer. The remote output 525 outputs head position and setting data in a digital or analog form usable by a remote display module. This function allows the operator to attach a remote display module to the remote output 525 via a cable and to place the remote display module in a location where the operator may conveniently view and/or record all or some of the data available on the panel 501. For example, the operator may place the remote display module adjacent to the camera eyepiece via an adhesive or mechanical connection for convenient and instantaneous viewing of head data.

While those of skill in the art will readily appreciate how to configure the circuitry of the electronics module to provide the desired behavior, certain features will be expressly set forth for the convenience of the reader. The electronic components within the electronics module may be placed on separate circuit boards, but it has been found that the use of a single dual sided circuit board is more compact and robust. Furthermore, it is desirable to backlight the panel 501. It has been found that an ideal way to provide such backlight is to illuminate the ends of a plurality of fiber optical cables, and terminate the non-illuminated ends of such cables at the back of the LCD display that provides the display information at panel 501. While the electronics module may be mounted on any part of the head, it has been found that the most convenient location for mounting the module is on the main body above the joint between the stationary base 3 and the housing 5, as illustrated in FIG. 1.

In order to sense the position of the drag sector assemblies 603, a potentiometer 611 is associated with the gears 609. In one exemplary arrangement, a gear 615 is fixed to the shaft 613 of the potentiometer 611. This gear 615 mates with one of the gears 609 so that rotation of gears 609 causes a rotation of the shaft 613 of the potentiometer 611. In this way, the resistance exhibited by the potentiometer 611 gives an indication of the current position of the drag sector assemblies 603, and hence of the level of drag currently experienced by shaft 607. In another embodiment, the shaft 613 of the potentiometer is directly attached to the shaft of a gear 609, providing a corresponding rather than simply proportional reading. The electrical outputs of the potentiometer 611 are supplied to the electronic module 503, for use in deriving a digital representation of the current drag.

The electronic module 503 also comprises two potentiometer adjustments for each drag assembly in order to adjust the indication of drag given so that it travels from at or near 0% for the minimum amount of drag applied, to at or near 100% for the maximum amount of drag applied. In particular, as those skilled in the art of electronics will appreciate, one factory settable potentiometer is provided to adjust the percentage indicated when the drag sector assemblies 603 are minimally interleaved, while a second factory settable potentiometer is provided to adjust the slope of the percentage indicated as a function of the amount of interleaving. In this way, the percentage of drag indicated on panel 501 can be adjusted so that minimal interleaving yields a reading at or near 0% while maximum interleaving yields a reading at or near 100%.

A drag mechanism such as that described above is placed on each axis, so that the shaft 607 is rotated coincident with rotation on the relevant axis. Likewise, the drag adjustment setting on each axis is relayed to the electronic module 503 and is displayed in the appropriate location on the panel 501.

Figure 7:
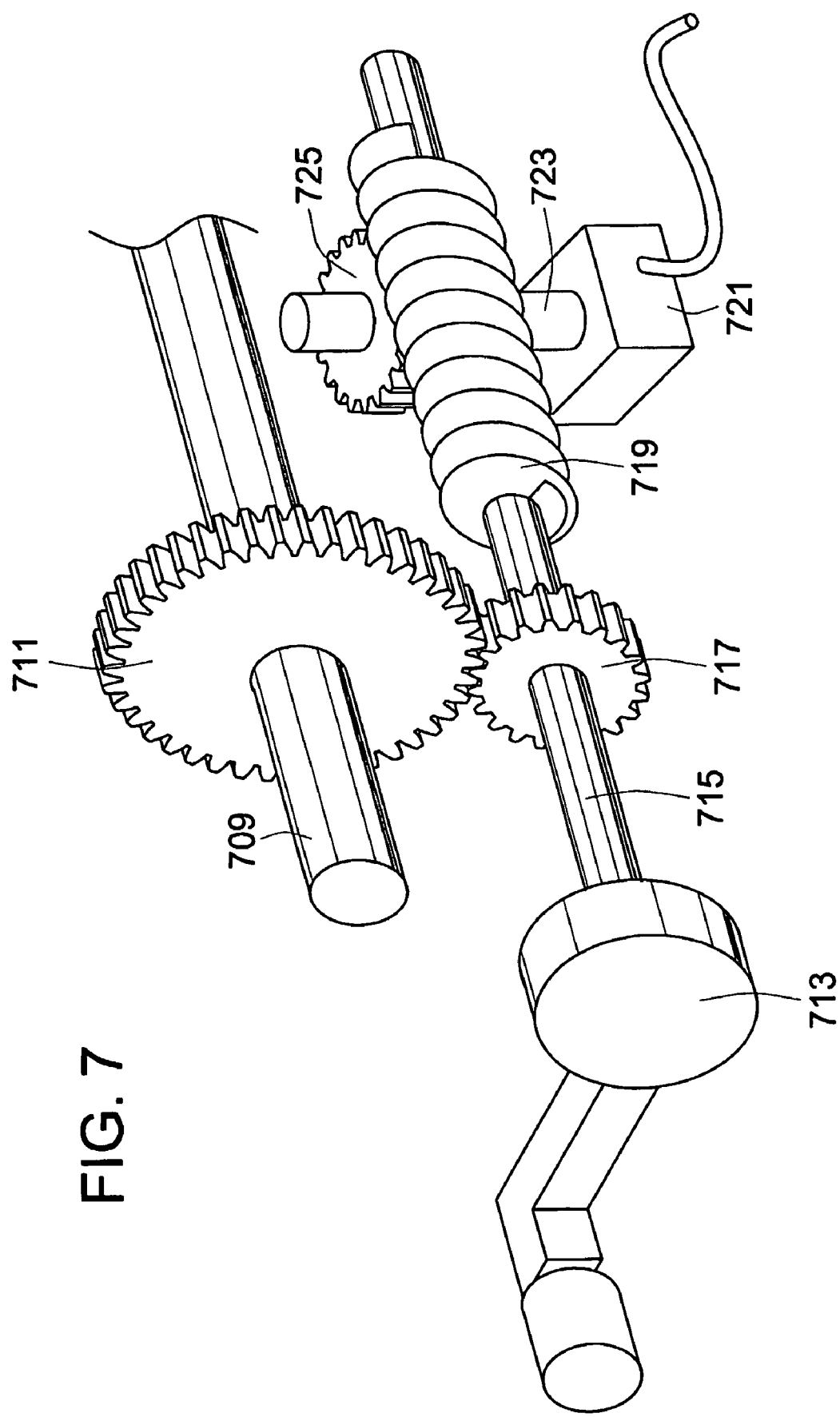
FIG. 7 is a perspective view of gearing used to actuate the tilt axis counterbalance mechanism according to an embodiment of the invention.

The remaining mechanisms usable to collect data for display on panel 501 will now be discussed in greater detail. Turning first to FIGS. 3 and 7, gears 301, 303 are driven via respective worm gears 305, 307, attached to a common shaft 309, and a further gear reduction is provided by a spur gear 311 attached to shaft 309 and indexed to a pinion gear. Referring to FIG. 7, a portion of the above gearing arrangement is shown in greater detail. Like numerals indicate like components, i.e., elements 709, 711, 713, and 715 of FIG. 7 correspond to elements 309, 311, 313, and 315 of FIG. 3.

The gearing arrangement of FIG. 7 provides for an electronic reading of the counterbalance position in the following manner. When knob 713 is rotated, in turn rotating pinion 717 and consequently spur 711, the counterbalance support towers 215, 217 are raised or lowered accordingly, adjusting the degree of counterbalance applied. At the same time, worm gear 719 fixed to common shaft 715 is rotated. This causes mating gear 725, fixed to the shaft 723 of potentiometer 721, to rotate as well, changing the resistance of the potentiometer 721. The leads of the potentiometer 721 are supplied to the electronic module 503 in order to give an indication of counterbalance applied on the relevant axis. Each axis that is counterbalanced has an associated potentiometer for measuring the counterbalance position as, for example, described above, and a corresponding display is provided at panel 501. As described above with respect to the calibration of drag position indication, each position measuring potentiometer is associated with two calibration potentiometers in the electronic module 503, usable to calibrate the indication of counterbalance displayed on panel 501.

Figure 8:
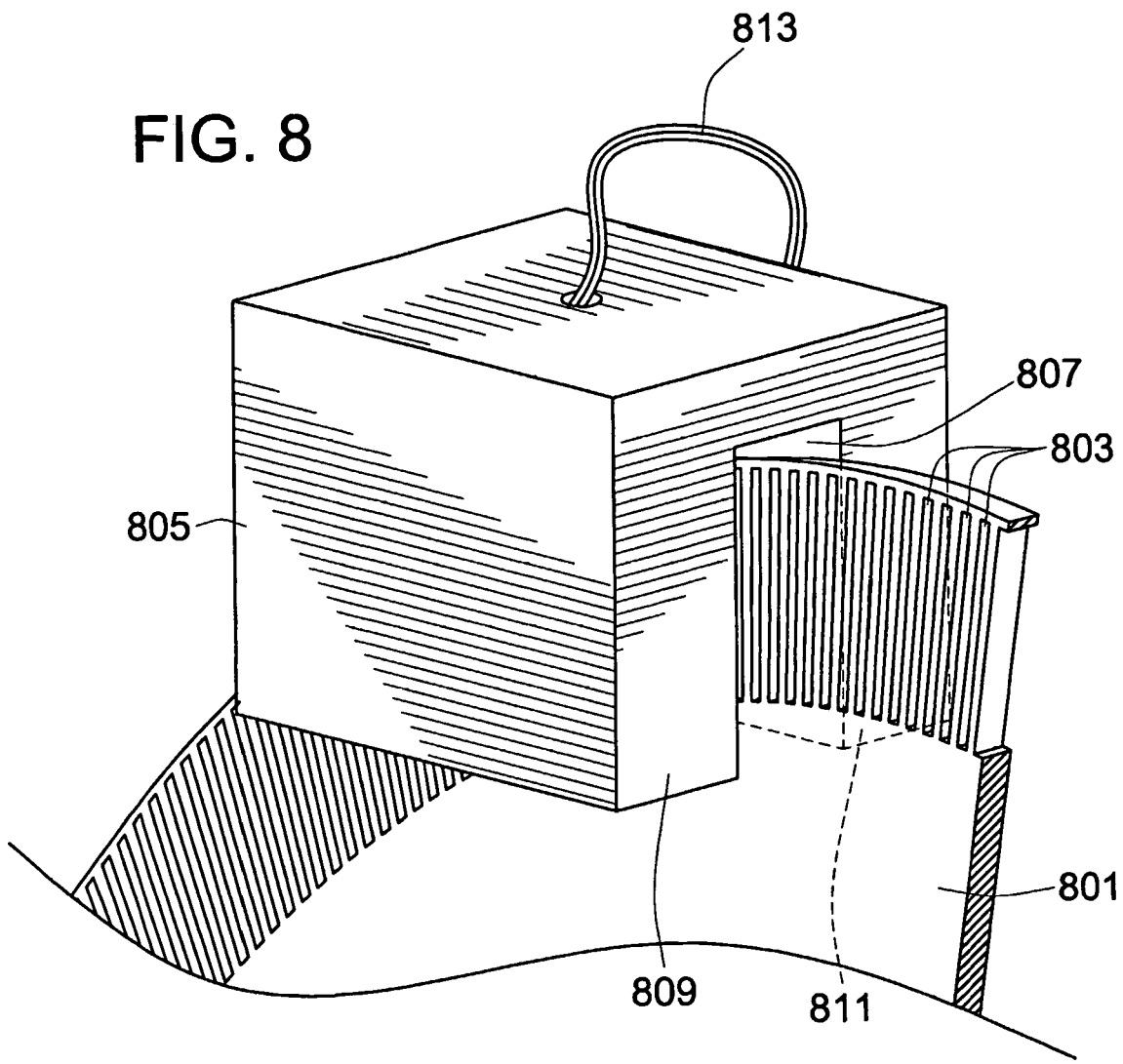
FIG. 8 is a fragmentary perspective view of a disc and associated optical pick-up for measuring camera position within an embodiment of the invention.

Within an embodiment of the invention, the position of the head itself is measured and displayed to the user via panel 501. In this case, it is desirable to use precision rotary encoders rather than simple resistance measurements because greater accuracy may thus be obtained. Exemplary rotary encoders are commercially available. For example, the High-Sensing Accuracy Optical Photo Interpreter, part number GP1A35RV, sold by SHARP ELECTRONICS may be used to encode the movement of an appropriately slotted disc. FIG. 8 schematically illustrates the basic configuration of a rotary encoder in use. An encoder disc 801 is attached to a shaft or other rotation center of interest so that the disc rotates when the rotation center rotates. Typically, the rotation center and the disc 801 are arranged to remain in a fixed angular relation to one another, although the disc may also be geared up or down to the rotation center of interest. The disc is perforated with slots 803 that are typically approximately several thousandths of an inch wide and deep. For example, the slots 803 provided with the GP1A35RV are 2 thousandths of an inch wide and 2 thousandths deep, corresponding to the axial thickness of the disc at the location of a slot.

A pick-up 805 having a slot 807 is situated such that the sides 809, 811 of the slot are in a straddling relationship with the disc 801. One or more light sources such as LEDs or laser diodes reside within one of the sides 809, while one or more light detection devices such as photodiodes or other devices reside in the other side 811. The light source and light detection devices are situated so that light from a light source in side 809 passing through a slot 803 is detected by a light detection device in the other side 811. In this manner, the motion of the disc is detected electronically and an indication of the motion is transmitted on leads 813. It is preferable that the disc 801 and pick-up 805 combination selected also detect the direction of movement of the disc 801. In addition, although the preferred encoding mechanism operates via light transmission, other systems, such as those that operate using reflectance rather than transmission may also be used. Also, the described encoders are absolute encoders as are preferable for best accuracy. However, other types of encoders such as relative encoders may also be used alternatively.

Figure 9:
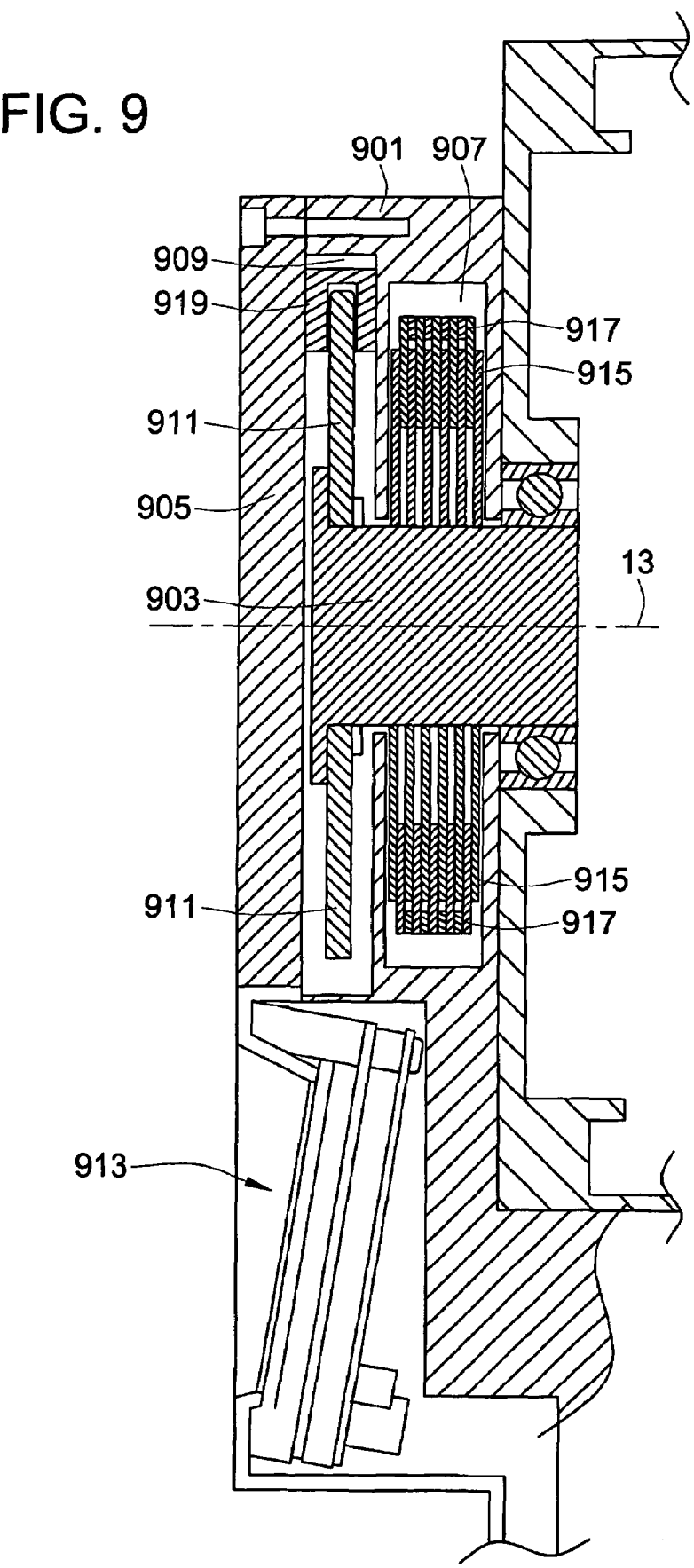
FIG. 9 is a cross sectional side view of the tilt axis drag inducement and position measurement mechanisms.

An encoder disc/pick-up combination such as that described above is preferably placed on each axis of movement for which it is desired to display position information. Preferably, position information is displayed for each axis, i.e. the roll, tilt, and pan axes. FIG. 9 shows a schematic cross section of a panhead according to an embodiment of the invention in the plane defined by axes 7 and 13 of FIG. 1, at the level of axis 13. Housing 901 and shaft 903 define a first annular cavity 907 centered about shaft 903, while housing 901, endplate 905, and shaft 903 define a second annular cavity 909 centered about shaft 903.

The first annular cavity 907 contains an adjustable drag mechanism as discussed with respect to FIG. 6. In particular, an annular drag disc assembly 915 is fixed to shaft 903 so as to rotate therewith, while one or more drag sector assemblies 917 are fixed with respect to the housing 901 except that they may be adjusted along a radius of axis 13. Adjustment of these drag sector assemblies 917 affects the drag associated with the rotation of shaft 903 in the manner described with respect to FIG. 6.

A slotted encoding disc 911 such as the disc 801 of FIG. 8 resides within cavity 909, being fixed upon and co-axial with shaft 903. A pick-up 919 such as pick-up 805 of FIG. 8 is situated within cavity 909 as well, being fixed to housing 901 so as to straddle encoding disc 911 as the disc rotates. Shaft 903 is also fixed to the tilting components of the panhead and defines the axis of tilting.

Accordingly, as the camera is tilted, in turn tilting the tilting components of the head, shaft 903 rotates in registration with the camera, causing disc 911 to rotate as well. As disc 911 rotates, the slots of the disc alternatingly pass and block light within the pick-up 909, creating an electrical signal indicative of the motion of the camera about the tilt axis 13. As discussed above, this signal is conveyed via electrical leads to the electronics module 913, corresponding to module 503 of FIG. 5, which then interprets and displays the information as a percentage of the range of available tilt motion. Note that the user may use the reset button for a given axis such as element 517 in FIG. 5, to set the current camera position as the zero position with respect to which future positions may be measured.

Note that the various cavities defined within the head and roll head may be changed, so that for example, more of the cavity is defined by one piece than by another, and so on. The only matter of consequence is that such a cavity somehow be defined. Also, note that the relation between the cavities 907, 909 need not be as shown. For example, the cavities, and associated elements, may be disposed on opposite sides of the head, rather than on the same side, such that one end of the axle 903 is associated with the drag mechanism, while the other end of the axle 903 is associated with the rotary measurement mechanism. Similarly, a tilt brake and tilt lock if used may be disposed at whichever end of the shaft 903 is convenient, and need not be on the same side as each other.

Figure 10:
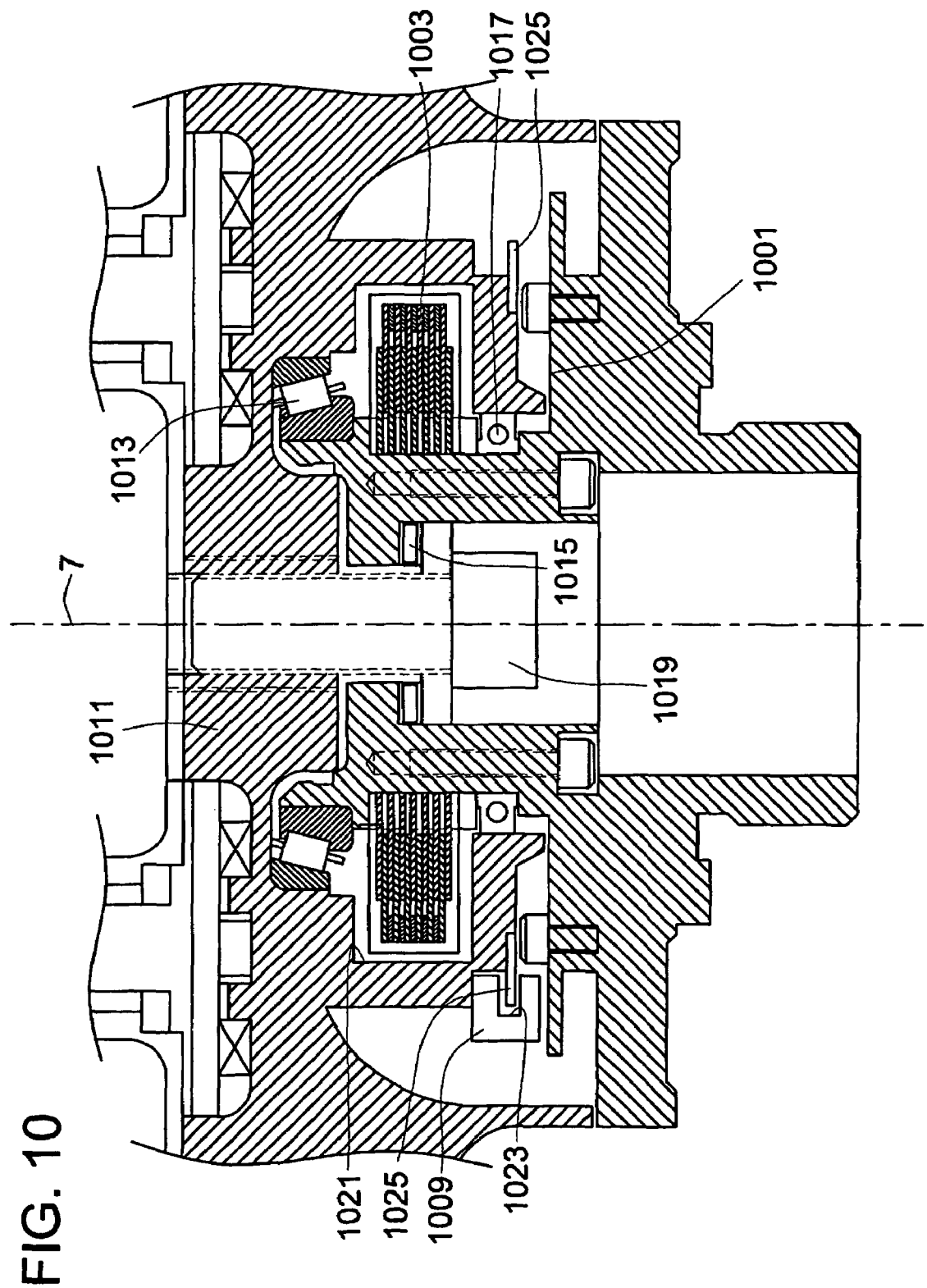
FIG. 10 is a cross sectional side view of the pan axis drag inducement and position measurement mechanisms.

In a similar fashion, the position information for the other axes is measured and conveyed to the electronics module 913 for display. FIG. 10 is a cross sectional view of the panhead taken in a plane defined by axes 7 and 13, viewed at the level of line 29. FIG. 10 schematically illustrates an exemplary position sensing mechanism for measuring the position of the camera about the pan axis 7. In particular, the base 1001 is fixed relative to a tripod or other support, while the upper housing 1011 which supports the remainder of the panhead is rotatably disposed upon the base 1001 and coupled thereto via a large bolt 1019 and washer assembly received in a channel in the upper housing 1011.

A plurality of bearings 1013, 1015, 1017 are preferably employed to minimize the friction of rotation and to bear the considerable weight of the camera and the upper portion of the head, all of which can rotate about axis 7. The bearings 1013 may be any suitable type, such as Timpkin tapered bearings, adapted to support both axial and radial loads. Bearings 1015 are preferably disposed to bear axial load associated with the central axle attachment between the upper housing 1011 and the base 1001. Suitable bearings for this purpose include any bearing capable of bearing the magnitude and direction of stress applied, such as Torrington thrust bearings. Bearings 1017 are situated so as to bear radial loads between base 1001 and the lower part of upper housing 1011. Note that the bearings 1015 and 1017 provide a balancing load for the preloaded the tapered bearings 1013 in the illustrated arrangement. As will appreciated by those of skill in the art, any other suitable number, type and arrangement of bearings may be used instead of the illustrated configuration.

The base defines two annular cavities 1021 and 1023. The first annular cavity 1021 contains an adjustable drag assembly 1003 similar in structure and operation to that described above with respect to the tilt axis, the adjustment position of which is measured and displayed as described above. Thus, the cavity 1021 additionally contains a suitable viscous fluid, such as one of the many silicon-based fluids familiar to those of skill in the art. The second annular cavity 1023 contains an encoder disc 1025 and pick-up 1009, operating in substantially the same manner as described above with respect to the tilt axis, to measure and relay the pan axis rotation position for display to the user. Note that in the illustrated embodiment, the pick-up 1009 rotates with the upper housing 1011, while the encoder disc 1025 remains fixed relative to the base 1001. However, those of skill in the art will appreciate that appropriate relative motion may also be achieved by fixing the pick-up 1009 relative to the base and allowing the disc 1025 to rotate with the upper housing 1011.

Note that a pan axis lock may also be employed to lock the rotation of the upper housing 1011 relative to the base 1001. This generally requires a moving locking piece fixed to the housing 1011 and a stationary locking piece fixed to the base 1001. Locking of the pan axis is effected by locking the moving and stationary locking pieces together. Typically, one locking piece will be a disc and the other a disc clamp or other locking mechanism.

FIG. 11 is a cross sectional view of the roll head attachment taken in a plane defined by axis 407 and vertical axis 421 in FIG. 4a. Note that although not shown in detail in this figure, the camera is preferably adjustable both fore and aft and side to side, so that the center of gravity of the camera exerts neither a roll moment nor a tilt moment. The adjustments may be made by way of sliding dovetails and dovetail mounts or otherwise, as will appreciated by those of skill in the art. The housing 1101, corresponding to housing 403, preferably contains a damping mechanism and a position encoding mechanism, and may also contain a counterbalance mechanism. In particular, a first annular cavity 1103 contains an adjustable drag assembly 1105 similar in structure and operation to that described above with respect to the tilt axis, the adjustment position of which is measured and displayed as described above. A second annular cavity 1107 contains an encoder disc 1109 and pick-up 1111, operating in substantially the same manner as described above with respect to the tilt axis, to measure and relay the roll axis rotation position for display to the user.

The housing 1101 optionally defines a third annular cavity 1113, containing an adjustable counterbalance mechanism, preferably of the design described above or alternatively as described in the '568 patent. If a counterbalance mechanism is employed to counterbalance the camera about the roll axis, its setting is preferably detected, relayed and indicated to the user as described above with respect to the tilt axis. Note that since the roll head attachment is optional, the electrical signals relating to the damping, counterbalance, and position of the roll head are carried by a separate cable having a male LEMO connector to be plugged into port 527 of the electronics module 503. Note that the aforementioned features of the dutch roll head are preferably also included in an embodiment as illustrated in FIGS. 4b-d.

As discussed above, the electronic features of the panhead typically receive electrical power from a portable battery pack that is affixed to the head or to the tripod or other support. An exemplary construction for the battery pack is illustrated in cross sectional view in FIGS. 12a and 12b. FIG. 12a shows the battery pack completely assembled while FIG. 12b shows the battery pack completely disassembled. The battery pack is constructed of three mating pieces, a battery holder 1201, a first top 1203 and a second top 1205. The battery holder 1201 and the first top 1203 are made primarily of electrically nonconductive material such as plastic, while the second top 1205 is made primarily of electrically conductive material such as aluminum. The battery holder 1201 contains a bottom contact 1207 for contacting a bottom battery 1209 shown in outline in FIG. 12a. The bottom contact 1207 is electrically isolated from the battery holder 1201, but is in electrical contact with pin 1211 via a wire, not visible in these illustrations, when the battery pack is assembled as in FIG. 12a.

The pin 1211 in the first top 1203 serves to provide electrical contact between the bottom contact 1207 and the body of second top 1205. A central contact 1213 in first top 1203 makes electrical contact with the positive end of the series of batteries within holder 1201 when the pack is assembled as in FIG. 12a. In turn a central contact 1215 in second top 1205 makes electrical contact with the central contact 1213 when the pack is assembled as in FIG. 12a. A spring 1217 allows for varying tolerance of the placement of the second top 1205 with respect to the first top 1203. In this manner, the negative or ground voltage of the batteries in the pack is exposed to the panhead via top 1205, while the positive voltage is exposed via contact 1215. Note that contact 1215 is electrically isolated from top 1205.

The fit and function of the battery pack are illustrated in perspective view in FIG. 13 for the convenience of the reader. Elements 1301, 1303, 1305, 1311, 1313, and 1315 correspond to elements 1201, 1203, 1205, 1211, 1213, and 1215 respectively of FIGS. 12a and 12b. It can be seen that the battery pack described herein allows a user to quickly change batteries in two different ways. In particular, the user may rotate and pull the holder 1301 to detach it from the first and second tops 1303, 1305. Once the batteries in the holder are exchanged for fresh batteries, the user may push and rotate holder 1301 to reassemble the battery pack. Alternatively, the user may push and rotate both the holder 1301 and first top 1303, disengaging them as a unit from second top 1305. In this manner, another assembled holder and first top may replace the removed unit to provide fresh electrical power. Preferably, the battery pack is assembled to a panhead using the same steps of linearly advancing the battery pack toward the panhead, and axially rotating the battery pack to make the electrical connections. While the holder 1301 and first and second tops 1303, 1305 are illustrated as cylindrical in shape, it will be appreciated that alternate shapes may be provided.

Note that in either manner of changing out the battery pack from the panhead, power to the electronics module will be interrupted momentarily. For this reason, it is desirable that the electronics module incorporates a capacitor or other electrical energy storage device to provide a short period, such as thirty seconds, of reserve power during battery change. While the battery pack is preferably adapted to accommodate 2 "C" size cells, any other number and size of cells may equivalently be used.

Because the panhead and related components as described herein are generally intended for use with heavy cameras or other equipment, according to another feature of the invention, an improved mechanism for mounting the camera to the panhead is provided. In particular, it is difficult and inconvenient to be forced to slide a heavy camera or roll head mounted on a dovetail platform completely out of a dovetail base before being able to remove it. Even with dovetail bases that would allow a dovetail side to be forced down to permit camera removal, the operator is required to manually force the side down. Unfortunately, clearances are generally such that this is often difficult or impossible.

Figure 14:
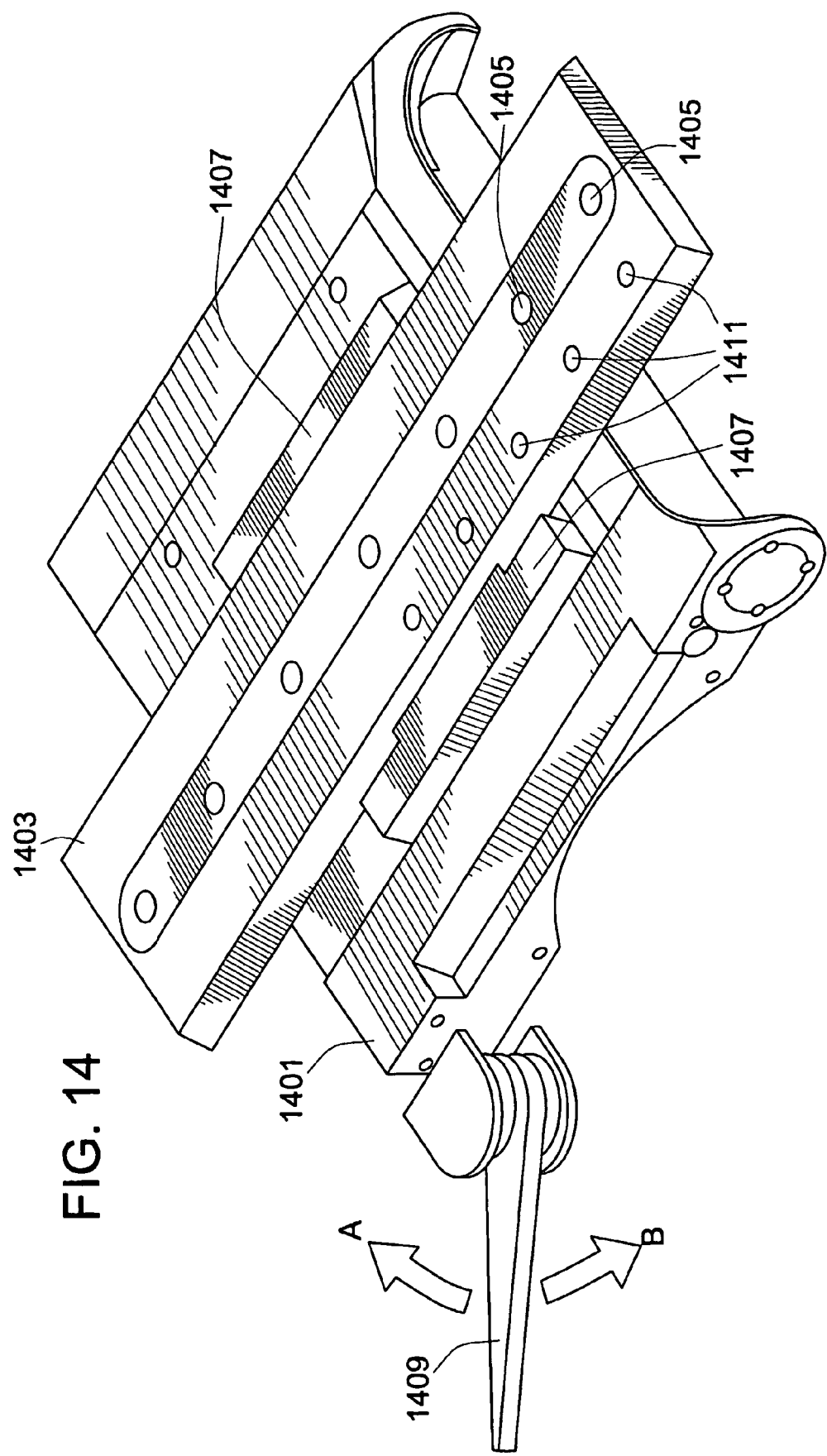
FIG. 14 is a partially exploded perspective view of an improved dovetail camera mounting system according to an embodiment of the invention.

In an embodiment of the invention, a novel dovetail base is provided that allows an operator to automatically lower one dovetail side by simply moving a lever. FIG. 14 shows a perspective view of the novel base 1401, with a dovetail platform 1403 mounted. In operation, the dovetail rail assembly or platform 1403 is mounted to the bottom of the camera or roll head via screw holes 1405, and is then mounted on the dovetail base 1401 by being compressed between dovetail sides 1407 shaped to mate with the platform 1403. A lever 1409 is provided and is adapted to compress the dovetail sides 1407 when pushed in one direction B, and to uncompress the dovetail sides 1407 and then drop one of sides 1407 when pushed in the other direction A. The platform 1403 is indexed to the base 1401 via a rack and pinion mechanism to be more fully described below. Note that screw holes 1411 are used to attach the rack to the underside of the platform 1403.

Figure 15:
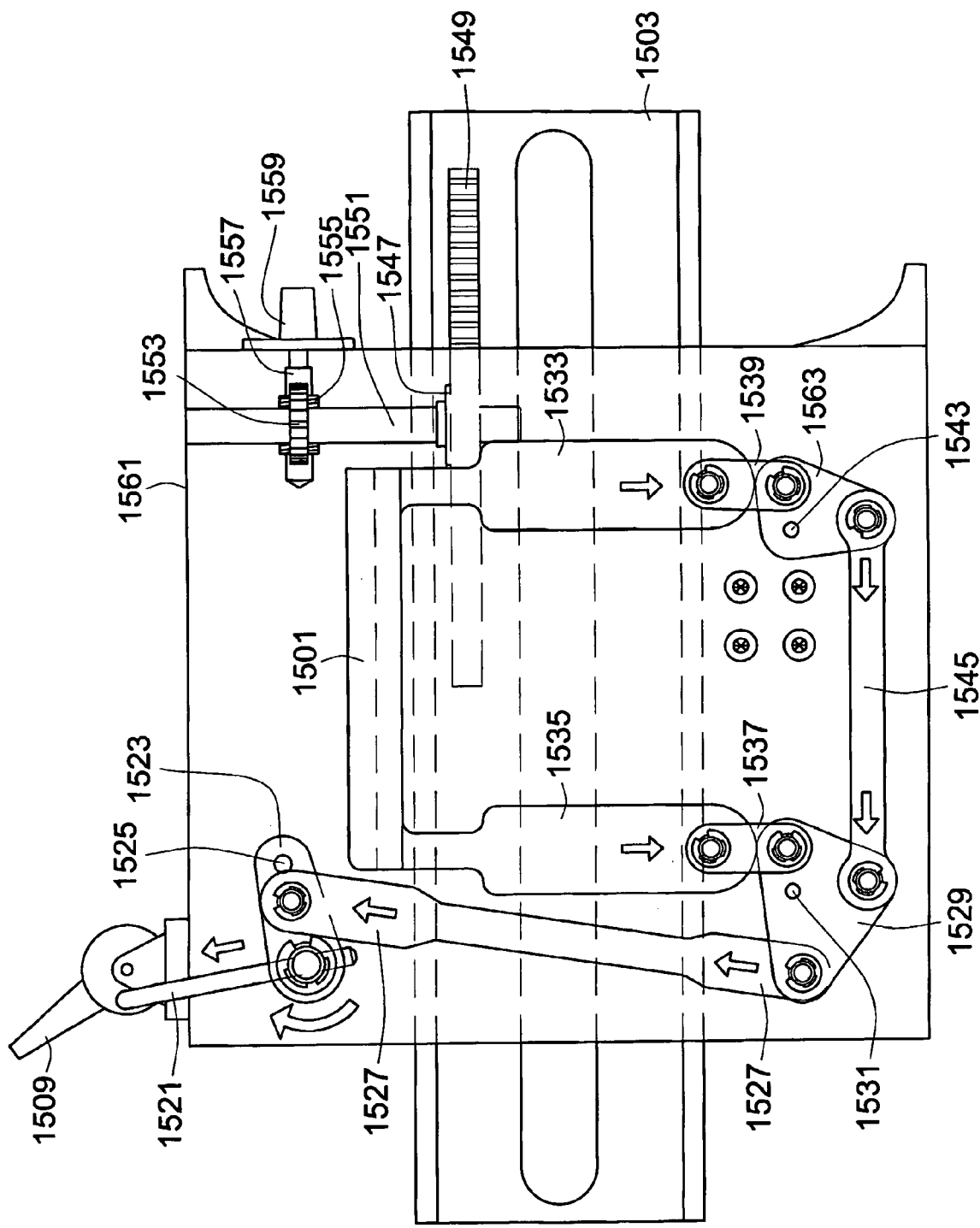
FIG. 15 is a cross sectional bottom view of the improved dovetail camera mounting system according to an embodiment of the invention.

FIG. 15 shows a schematic bottom view of the platform 1401, including one dovetail side 1501 (see also 1407 in FIG. 14). This view is provided so that user may understand the mechanism by which the dovetail sides are pressed together. Manipulation of lever 1509 can be used to either cause dovetail side 1501 to move toward and mate with dovetail platform 1503, or to cause dovetail side 1501 to move away and downward from dovetail platform 1503. According to the presently preferred embodiment, one dovetail 1501 of the platform moves to allow placement of the dovetail platform 1403, as explained herein, while the dovetail 1407 along the opposite side of the platform 1403 remains stationary. In this way, the user simply places one edge of the dovetail platform 1403 underneath the stationary dovetail 1407, and then activates the opposite dovetail 1501 to clamp the platform 1403 in position.

In particular, as lever 1509 is pushed in a clockwise direction, it exerts a pull force on first link 1521, pivoting lever 1523, to which it is hinged, about pivot 1525, thus exerting a leveraged pull force along dogbone 1527, which is hinged to lever 1525. Dogbone 1527 in turn pulls on and rotates link 1529 clockwise about pivot 1531. This motion causes symmetrical pulling motions by side pieces 1535 and 1533. With the left portion of the assembly as illustrated, the movement of dogbone 1527 causes link 1529 to pivot about pivot point 1531, causing a clamping or downward motion as viewed on side piece 1535 via short link 1537. This clamping motion is transmitted to the opposite side piece 1533 of the dovetail side 1501 by link 1545, which causes link 1563 to rotate about pivot 1543 and place a downward clamping force on side piece 1533 via short link 1539. In this way, the rotation of the lever 1509 clockwise will compress as dovetail side 1501 exerts a force against dovetail platform 1503, locking the camera in position with respect to the dovetail base 1561.

Figure 16A:
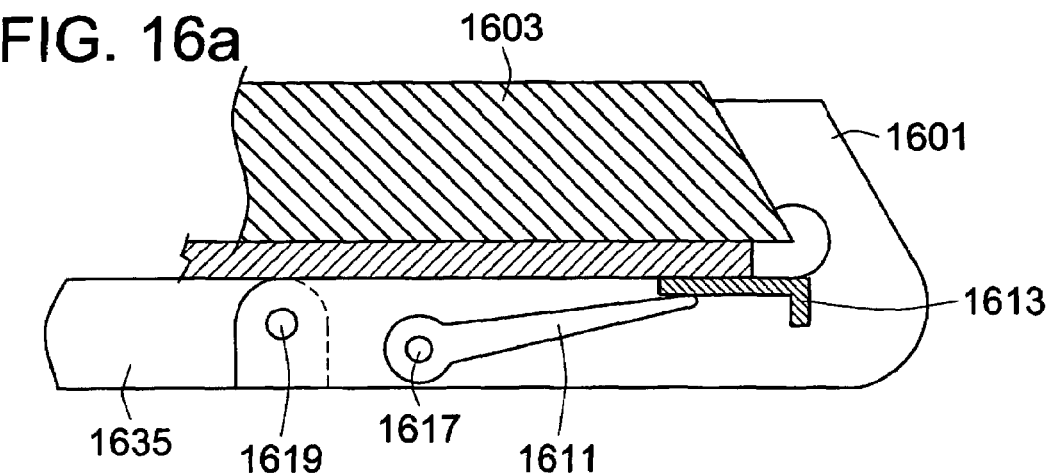
FIG. 16a is a fragmentary, partial cross sectional side view of a dovetail side lowering mechanism according to an embodiment of the invention with a dovetail side in a mating relation with a matching side of a dovetail platform.

Conversely, moving the lever 1509 in a counterclockwise direction serves to move dovetail side 1501 away and downward from dovetail platform 1503, effectively allowing the camera and platform 1503 to be simply lifted off the base 1561. The mechanism by which this occurs is illustrated in greater detail in FIG. 16. FIG. 16 shows a schematic partial cross sectional view of a plane defined by axes 7 and 13 of FIG. 1. FIG. 16a shows the mechanism in a compressed position, i.e., clamped with dovetail side 1601 pressed against a mating surface of dovetail platform 1603. In this view, it can be seen that dovetail side 1601 is pivotally linked to side piece 1635 corresponding to side piece 1535 at pivot 1619. Corresponding side piece 1633 is hidden from view behind side piece 1635, but acts identically to side piece 1635.

According to one feature of the invention, the dovetail side 1601 physically moves outward and downward to allow the dovetail platform 1603 to be easily placed and located beneath the stationary dovetail side along the opposite edge of the dovetail platform 1603. In this way, as lever 1509 of FIG. 15 is moved from its compressed position in a counterclockwise direction, the reverse process to that described above occurs; that is, side piece 1635 pushes dovetail side 1601 away from platform 1603. The dovetail side 1601 is then physically moved downward, through the horizontal plane by a camming arrangement. In the presently preferred camming arrangement, this movement is the result of the engagement of a trip lever 1611 and a trip catch 1613, although other camming arrangements are likewise within the spirit and scope of the invention.

Figure 16B:
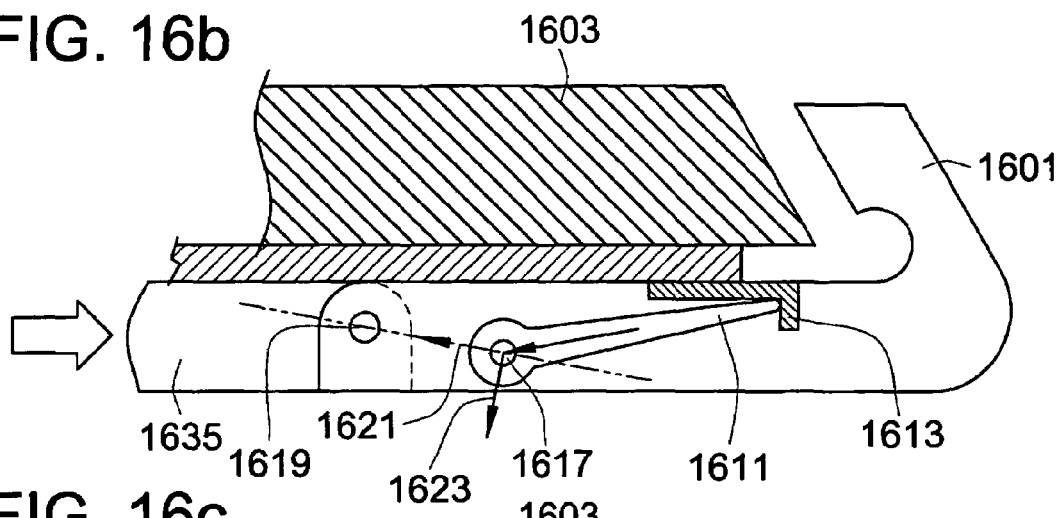
FIG. 16b is a fragmentary, partial cross sectional side view of the dovetail side lowering mechanism according to an embodiment of the invention with the dovetail side in a withdrawn relation from the matching side of the dovetail platform.
Figure 16C:
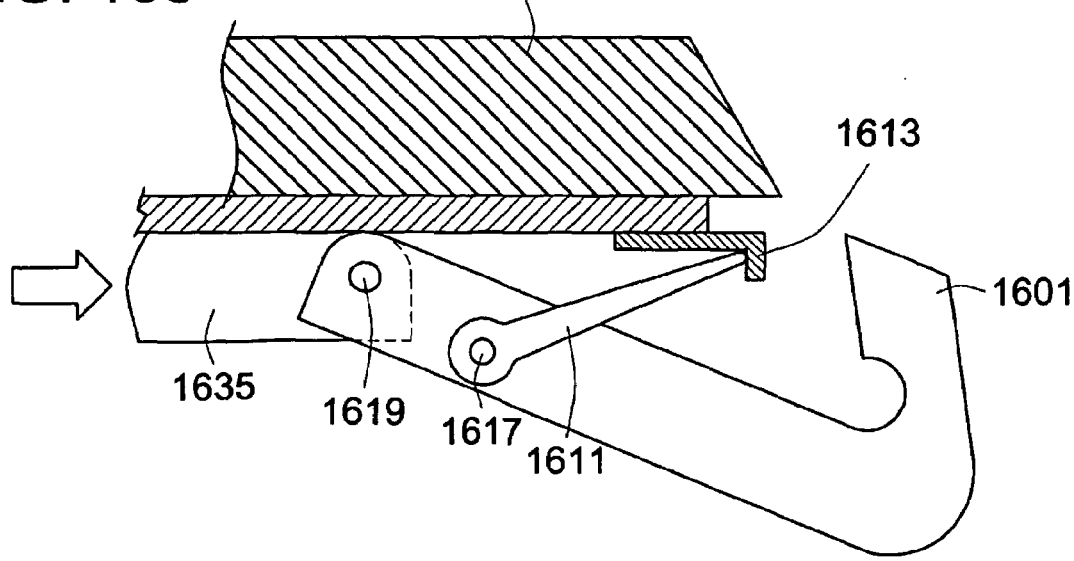
FIG. 16c is a fragmentary partial cross sectional side view of the dovetail side lowering mechanism according to an embodiment of the invention with the dovetail side in a withdrawn and lowered relation with the matching side of the dovetail platform.

As can be seen in FIG. 16b, as dovetail side 1601 moves away, trip lever 1611, which is pivotally mounted to dovetail side 1601 at 1617, slides to engagement with the downward projection of trip catch 1613. Both the trip lever 1611 and the dovetail 1601 are biased upward. Trip catch 1613 is fixed to base 1561 as shown and does not move with dovetail side 1601. Consequently, as side piece 1635 continues to push dovetail side 1601 away from platform 1603, trip lever 1611, which can no longer move linearly because it abuts catch 1613, rotates counterclockwise, exerting a clockwise rotational force on dovetail side 1601, forcing it downward, as seen in FIG. 16c.

The clockwise rotational force depends upon the pivot point 1617 of the trip lever 1611 being lower than the pivot point 1619 between side piece 1635 and dovetail side 1601. Theoretically, the force exerted along link lever 1611 can be resolved into two perpendicular components. One component 1621 is directed along the line between pivot points 1619 and 1617, and this component has no effect and produces no movement. The other component 1623 is perpendicular to the line between pivot points 1619 and 1617, and it is this component that produces the clockwise rotation that moves the side piece 1601 downward from platform 1603.

While the trip lever 1611 has been shown pivotably coupled to the side piece 1601 and the trip catch 1613 fixed to the base 1561, it will be appreciated by those of skill in the art that the trip lever could alternately be pivotably coupled to the base and the trip catch fixed to the side piece. Under such an arrangement, the trip lever could slide along the upper surface of the side piece until it engages the trip catch at which time continued force exertion would cause the side piece to pivot the dovetail side down and through the horizontal plane. In such an arrangement, the pivot axis of the trip lever would be disposed above, rather than below, the pivot axis of the side piece. These are but two examples of how such a camming arrangement may be incorporated to provide the lowering movement of the dovetail side. It is further within the invention, as will be appreciated by those of skill in the art, to actuate the dovetail side 1601 such that substantial lateral movement is not required before downward movement of the side 1601 commences.

Returning to FIG. 15, once the dovetail platform 1503 is placed on the base, but before it is locked into position by the force of dovetail side 1501, it is desirable to adjust the position of the camera fore and aft to properly place the camera center of gravity. In the platform according to an embodiment of the invention, a pinion gear 1547 is used to move rack 1549 thus moving the dovetail platform 1503 and attached camera. This movement may be provided by way of a rotatable knob 1559, which is coupled to the pinion gear 1547. More specifically, pinion 1547 is secured to shaft 1551. A helical gear 1553 is also attached to the shaft 1551 and is also mated to a helical gear 1555. In turn, the helical gear 1555 is attached to a shaft 1557 that the user may turn by turning attached knob 1559. In this manner, the user may conveniently use knob 1559 to move the dovetail platform 1503 fore and aft to properly place the camera center of gravity once the platform 1503 is resting on but not locked to the base.

It will be appreciated that a new and novel camera panhead, rollhead, mounting system, and power system have been described herein. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the claims and equivalents thereof.

I claim:

1. A panhead for supporting equipment and providing movement from a vertical position to a tilt position, said panhead comprising, in combination,
    a tilt housing,
    a rotatable structure defining a tilt axis, said rotatable structure being mounted within said housing for rotation about said tilt axis, at least four springs, said springs forming at least a first pair of springs and a second separate pair of springs, said springs of said first pair of springs being mounted such that the springs are disposed substantially parallel to one another, said springs of said second pair of springs being disposed substantially parallel to one another, said at least four springs being mounted in planes substantially perpendicular to said tilt axis, a common axis disposed substantially parallel to the tilt axis, a horizontal plane including said common axis, said common axis and said tilt axis defining a vertical plane containing both axes, at least one mount for mounting one end of each of said springs pivotally along said common axis, the opposite ends of the springs being disposed on a same side of the horizontal plane, said opposite ends of said first pair being disposed one side of the vertical plane and said opposite ends of the second pair being disposed on the opposite side of the vertical plane, the ends of one spring in each pair of springs coupled to the common axis by said at least one mount being mounted between the ends of the other pair of springs coupled to the common axis, such that the ends of the spring pairs to the common axis are staggered, and a plurality of mounts for coupling the opposite ends of each pair of said springs to the rotatable structure for rotation therewith, said pairs of springs being mounted at an angle to a substantially vertical plane containing the tilt axis when said panhead is in said vertical position, whereby said springs exert a restoring torque when the rotatable structure is tilted from said vertical position to said tilt position.

2. The panhead according to claim 1 further comprising an adjustment gearing for controllably positioning the common axis relative to the tilt axis.

3. The panhead according to claim 2 further comprising a common axle oriented substantially along the common axis, the one end of said springs being coupled to said common axle, the adjustment gearing further comprising at least two rotatably mounted vertical threaded shafts, each threaded shaft having an axis of rotation, the axes of the threaded shafts being substantially fixed relative to the tilt axis, the threaded shafts being threadably coupled to said common axle whereby rotation of the threaded shafts moves the common axle to vary the distance between the common axis and the tilt axis.

4. The panhead according to claim 3 wherein the adjustment gearing further comprises a synchronizer for rotationally indexing each screw to the other.

5. The panhead according to claim 1 further comprising a tilt drag assembly for exerting a drag force against rotation of the rotatable structure tilt drum.

6. The panhead according to claim 1 further comprising a vertical pan shaft defining a vertical pan axis, and a base housing for mounting said tilt housing on said vertical pan shaft for rotation of said tilt housing about said vertical pan axis.

7. The panhead according to claim 6 further comprising a pan drag assembly for exerting a drag force against rotation of the tilt housing on said vertical pan shaft about said vertical pan axis.

8. The panhead according to claim 6 further comprising a first integral rotary sensor disposed within the tilt housing and adapted to sense rotation of the tilt drum about the tilt axis and output a first signal indicative of the rotation of the tilt drum about the tilt axis.

9. The panhead according to claim 8 further comprising a second integral rotary sensor disposed within the base housing and adapted to sense rotation of the tilt housing about the pan axis and output a second signal indicative of the rotation of the tilt housing about the pan axis.

10. The panhead according to claim 9 further comprising a display unit for displaying a first display related to the rotation of the tilt drum about the tilt axis and a second display related to the rotation of the tilt housing about the pan axis, wherein the first and second displays are derived from the first and second signals respectively.

11. The panhead according to claim 10 further comprising a roll head mounted to the panhead for rotation of the supported equipment for rotation of the supported equipment about a roll axis, the display unit further comprising an input for receiving a third signal indicative of an amount of roll about the roll axis experienced by the roll head mounted to the panhead, and a third display related to the amount of roll about the roll axis experienced by the roll head, wherein the third display is derived from the third signal.

12. The panhead according to claim 10 wherein the display unit further comprises a plurality of further displays for displaying at least an indication related to the restoring torque exerted about the tilt axis when the tilt drum is tilted from an equilibrium position.

13. The panhead according to claim 7 further comprising a tilt drag assembly for exerting a drag force against rotation of the tilt drum, and a display unit for displaying an indication related to an amount of drag force exerted against rotation of the tilt drum about the tilt axis or the tilt housing about the pan axis.

14. The panhead according to claim 13 further comprising a roll head mounted to the panhead for rotation of the supported equipment about a roll axis, the display unit further comprising a roll display for displaying an indication related to an amount of drag force exerted against rotation of the roll head about the roll axis.

15. A counterbalance for use in exerting a counterbalancing force when moved from a vertical position to a tilt position about a tilt axis, the counterbalance comprising:

a rotatable structure that is rotatable about the tilt axis;

a common axle that is not rotatable about the tilt axis, said common axle having a common axis which is parallel to the tilt axis;

at least two common axle supports supporting the common axle;

first and second lateral axes disposed along either side of a vertical plane containing said tilt axis, each said lateral axis being disposed parallel to but not collinear with the tilt axis, said first and second axes being disposed for rotation with said rotatable structure about the tilt axis;

a first pair of compressive spring assemblies coupled both to the common axle through a first pair of couplings and to said first lateral axis;

a second pair of compressive spring assemblies coupled both to the common axle through a second pair of couplings and to said second lateral axis, one of the first pair of couplings lying between the second pair of couplings along the common axle, and one of the second pair of couplings lying between the first pair of couplings along the common axle, such that the spring pair mountings to the common axis are staggered; and a first rotary sensor for sensing the rotation of the rotatable structure about the tilt axis, and for producing an electrical tilt output indicative of the amount and direction of rotation of the rotatable structure about the tilt axis.

16. The counterbalance according to claim 15 wherein the first lateral axis is disposed a first distance from the common axis, and the second lateral axis is disposed a second distance from the common axis, said the first and second distances being substantially equal in the vertical position, rotation of the rotatable structure from the vertical position to the tilt position lengthening one said distance and shortening the other said distance such that the compressive spring assemblies produce said counterbalancing force about the tilt axis, said counterbalance further comprising a counterbalance adjustment mechanism including an adjustment that moves the common axle towards or away from the tilt axis, adjusting the first and second distances to adjust the counterbalancing force exerted by the compressive spring assemblies.

17. The counterbalance according to claim 15 further comprising a tilt housing external to and enclosing the rotatable structure, the common axle, the first and second pairs of compressive spring assemblies, and said first rotary sensor.

18. The counterbalance according to claim 17 further comprising a base housing, and a pan axle on a pan axis about which the tilt housing may rotate, said base housing housing the pan axle.

19. The counterbalance according to claim 18, further comprising within the base housing a second rotary sensor for sensing the rotation of the tilt housing about the pan axis and for producing an electrical tilt output indicative of the amount of rotation of the tilt housing about the pan axis.

20. A counterbalance for use in exerting a counterbalancing force when moved from a vertical position to a tilt position about a tilt axis, the counterbalance comprising:

a rotatable structure;

a tilt axis within said rotatable structure;

a common axle within said rotatable structure, said common axle having a common axis that is parallel to the tilt axis;

first and second lateral axes disposed along either side of a vertical plane containing said tilt axis, each said lateral axis being disposed parallel to but not collinear with the tilt axis;

a first pair of spring assemblies coupled both to the common axle through a first pair of couplings and at said first lateral axis; and a second pair of spring assemblies coupled both to the common axle through a second pair of couplings and at said second lateral axis, one of the first pair of couplings lying between the second pair of couplings along the common axle, and one of the second pair of couplings lying between the first pair of couplings along the common axle, such that the spring pair mountings to the common axis are staggered;

one of either the common axle or the first and second lateral axes being rotatable about the tilt axis, the other being rotatably fixed relative to the tilt axis whereby said spring assemblies exert said counterbalancing force during such rotation.

21. The counterbalance of claim 20 wherein said common axle is rotatable about the tilt axis, and said first and second lateral axes are rotationally fixed relative to the tilt axis.

22. The counterbalance of claim 20 wherein said common axle is not rotatable about the tilt axis, and said first and second lateral axes are rotatable about the tilt axis.

* * * * *